US012561942B2

(12) United States Patent
He et al.

(10) Patent No.: US 12,561,942 B2
(45) Date of Patent: Feb. 24, 2026

(54) MULTI-CHANNEL DYNAMIC WEATHER ESTIMATION

(71) Applicant: Waymo LLC, Mountain View, CA (US)

(72) Inventors: Xiaoying He, Palo Alto, CA (US); Haoxuan Zheng, Santa Clara, CA (US); Jingyuan Linda Zhang, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 262 days.

(21) Appl. No.: 18/540,461

(22) Filed: Dec. 14, 2023

(65) Prior Publication Data

US 2025/0200932 A1 Jun. 19, 2025

(51) Int. Cl.
| | |
|---|---|
| *G06V 10/60* | (2022.01) |
| *G01S 17/89* | (2020.01) |
| *G06V 10/24* | (2022.01) |

(52) U.S. Cl.
CPC ............. *G06V 10/60* (2022.01); *G01S 17/89* (2013.01); *G06V 10/24* (2022.01)

(58) Field of Classification Search
CPC ........ G06V 10/60; G06V 10/24; G01S 17/89; G01S 7/4808; G01S 17/86; G01S 17/931
See application file for complete search history.

(56) References Cited

U.S. PATENT DOCUMENTS

| | | | |
|---|---|---|---|
| 9,632,210 | B2 | 4/2017 | Zhu et al. |
| 10,726,579 | B1 | 7/2020 | Huang |

(Continued)

FOREIGN PATENT DOCUMENTS

| | | | | |
|---|---|---|---|---|
| CN | 113985428 A | * | 1/2022 | ............. G01S 17/42 |
| WO | 2014168851 A1 | | 10/2014 | |
| WO | 2022271752 A1 | | 12/2022 | |

OTHER PUBLICATIONS

Pan Wei et al. ,"LiDAR and Camera Detection Fusion in a Real-Time Industrial Multi-Sensor Collision Avoidance System," May 30, 2018, Electronics 2018, 7, 84, pp. 1-22.*

(Continued)

*Primary Examiner* — Omar S Ismail
(74) *Attorney, Agent, or Firm* — McDonnell Boehnen Hulbert & Berghoff LLP

(57) ABSTRACT

Example embodiments relate to multi-channel dynamic weather estimations. An example embodiment includes a method. The method includes capturing, using a camera, an image of a first field of view of a surrounding environment from a first perspective. The method also includes capturing, using a light detection and ranging (lidar) device, a point cloud of a second field of view of the surrounding environment from a second perspective. Additionally, the method includes aligning, by a computing device, the image with the point cloud. Further, the method includes identifying, by the computing device, one or more high-intensity regions and one or more low-intensity regions of the surrounding environment. In addition, the method includes determining, by the computing device, a first figure of merit that characterizes environmental conditions of the surrounding environment and a second figure of merit that characterizes environmental conditions of the surrounding environment.

20 Claims, 20 Drawing Sheets

(56) References Cited

U.S. PATENT DOCUMENTS

| | | | | |
|---|---|---|---|---|
| 10,754,035 | B2 | 8/2020 | Taylor et al. | |
| 10,859,684 | B1 | 12/2020 | Nabatchian | |
| 11,199,614 | B1 | 12/2021 | Gan et al. | |
| 2018/0096493 | A1 | 4/2018 | Bier | |
| 2019/0056483 | A1* | 2/2019 | Bradley | G01S 7/4815 |
| 2019/0056484 | A1* | 2/2019 | Bradley | G01S 7/4815 |
| 2019/0120947 | A1 | 4/2019 | Wheeler et al. | |
| 2019/0120948 | A1* | 4/2019 | Yang | G01S 7/4817 |
| 2019/0340775 | A1* | 11/2019 | Lee | G01S 17/931 |
| 2019/0391270 | A1* | 12/2019 | Uehara | G01S 17/04 |
| 2020/0160559 | A1* | 5/2020 | Urtasun | G06N 3/09 |
| 2021/0096262 | A1* | 4/2021 | Vets | G01S 17/42 |
| 2021/0192788 | A1 | 6/2021 | Dierderichs et al. | |
| 2021/0349185 | A1* | 11/2021 | Schleuning | G01S 7/4815 |
| 2022/0057511 | A1* | 2/2022 | Zhu | G01S 17/89 |
| 2022/0236392 | A1* | 7/2022 | Ye | G01S 17/42 |
| 2023/0214728 | A1* | 7/2023 | Danilyuk | G06V 20/56 |
| | | | | 706/12 |
| 2024/0201377 | A1* | 6/2024 | Nestinger | G01S 17/89 |
| 2025/0022278 | A1* | 1/2025 | Li | G01S 17/931 |

OTHER PUBLICATIONS

Ehsan Javanmardi et al., "Autonomous vehicle self-localization based on abstract map and multichannel LiDAR in urban area," May 18, 2018, IATSS Research 43 (2019),pp. 1-9.*

Andrew M. Wallace et al., "Full Waveform LiDAR for Adverse Weather Conditions," Apr. 22, 2020, IEEE Transactions on Vehicular Technology, vol. 69, No. 7, Jul. 2020,pp. 7064-7074.*

Jianqing Wu et al., "Vehicle Detection under Adverse Weather from Roadside LiDAR Data," Jun. 17, 2020, Sensors 2020, 20, 3433,pp. 1-14.*

Jiandong Mao et al., "Preliminary results of water cloud and aerosol properties in the Yinchuan area using a Multi-wavelength lidar based on dual field of view," Dec. 15, 2021, Optics & Laser Technology 148 (2022) 107784,pp. 1-8.*

Kaiming He et al., "Single Image Haze Removal Using Dark Channel Prior," Aug. 31, 2010, IEEE Transactions on Pattern Analysis and Machine Intelligence, vol. 33, No. 12, Dec. 2011,pp. 2341-2351.*

Srinivasa G. Narasimhan et al., "Vision and the Atmosphere," Dec. 4, 2001, International Journal of Computer Vision 48(3),2002,pp. 233-254.*

Narasimhan, Srinivasa G., and Shree K. Nayar. "Vision and the atmosphere." International journal of computer vision 48 (2002): 233-254.

He, Kaiming, Jian Sun, and Xiaoou Tang. "Single image haze removal using dark channel prior." IEEE transactions on pattern analysis and machine intelligence 33, No. 12 (2010): 2341-2353.

Wei, Pan, Lucas Cagle, Tasmia Reza, John Ball, and James Gafford. "LiDAR and camera detection fusion in a real-time industrial multi-sensor collision avoidance system." Electronics 7, No. 6 (May 30, 2018): 84.

* cited by examiner

250

270

208

204B

212

204A

202

210

214

206

260

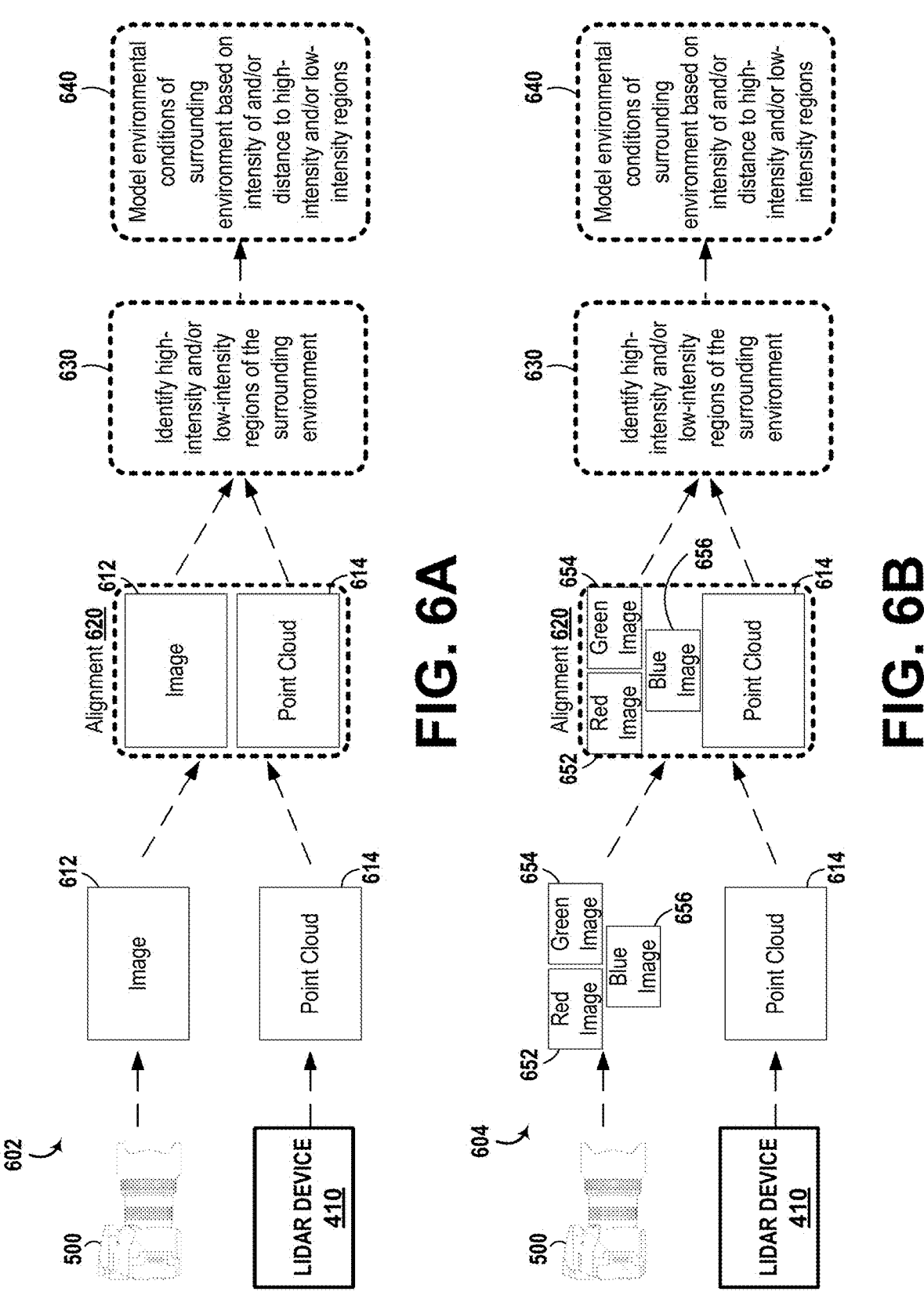

612

614

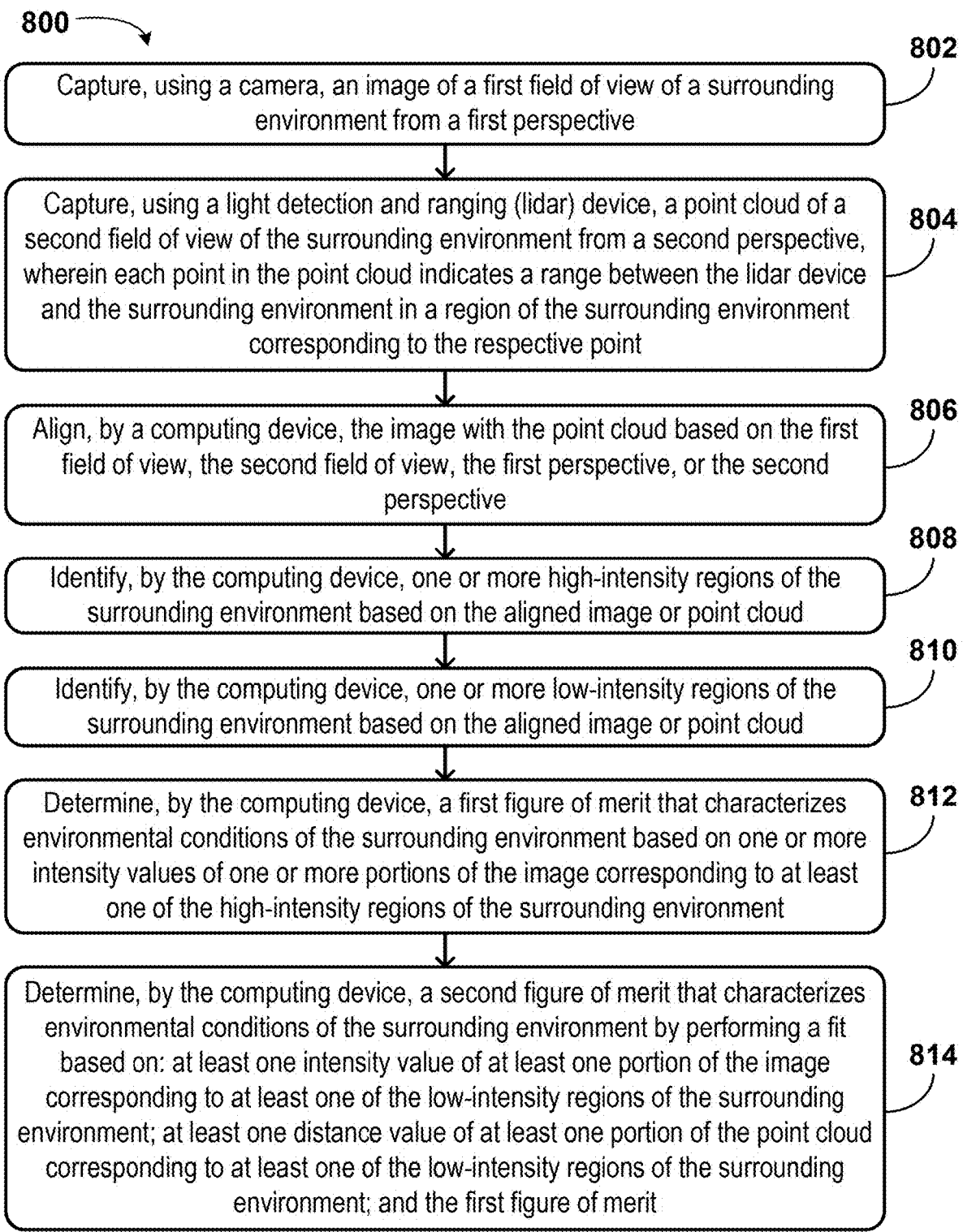

800

Capture, using a camera, an image of a first field of view of a surrounding environment from a first perspective
802

Capture, using a light detection and ranging (lidar) device, a point cloud of a second field of view of the surrounding environment from a second perspective, wherein each point in the point cloud indicates a range between the lidar device and the surrounding environment in a region of the surrounding environment corresponding to the respective point
804

Align, by a computing device, the image with the point cloud based on the first field of view, the second field of view, the first perspective, or the second perspective
806

Identify, by the computing device, one or more high-intensity regions of the surrounding environment based on the aligned image or point cloud
808

Identify, by the computing device, one or more low-intensity regions of the surrounding environment based on the aligned image or point cloud
810

Determine, by the computing device, a first figure of merit that characterizes environmental conditions of the surrounding environment based on one or more intensity values of one or more portions of the image corresponding to at least one of the high-intensity regions of the surrounding environment
812

Determine, by the computing device, a second figure of merit that characterizes environmental conditions of the surrounding environment by performing a fit based on: at least one intensity value of at least one portion of the image corresponding to at least one of the low-intensity regions of the surrounding environment; at least one distance value of at least one portion of the point cloud corresponding to at least one of the low-intensity regions of the surrounding environment; and the first figure of merit
814

FIG. 8

MULTI-CHANNEL DYNAMIC WEATHER ESTIMATION

BACKGROUND

Unless otherwise indicated herein, the description in this section is not prior art to the claims in this application and is not admitted to be prior art by inclusion in this section.

Cameras are devices used to capture images of a surrounding environment. Some cameras (e.g., film cameras) chemically capture an image on film. Other cameras (e.g., digital cameras) electrically capture image data (e.g., using image sensors such as charge-coupled devices (CCDs) or complementary metal-oxide-semiconductor (CMOS) sensors). Likewise, light detection and ranging (lidar) devices are devices used to capture point clouds of a surrounding environment. A lidar device may transmit one or more light signals into the surrounding environment (e.g., using one or more emitters) and detect reflections of the one or more light signals (e.g., using one or more detectors) to generate a point cloud. The point cloud may contain information about range to objects in the surrounding environment or reflectivity of objects in the surrounding environment. Additionally or alternatively, detectors of the lidar device may simply receive background light (e.g., in the near-infrared portion of the electromagnetic spectrum) without emitting light signals. Such background light may also be incorporated into one or more point clouds (e.g., the same point cloud(s) as contain information about range and/or reflectivity and/or different point cloud(s)).

Images captured by cameras and point clouds captured by lidar devices can be analyzed to determine information about the surrounding environment at the time of capture. For example, the field of computer vision involves a series of technologies used to capture data of surroundings and use the data to determine information about the surroundings. Further, computer vision may be used to perform object detection, identification, and/or avoidance. As an example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications). In some cases, computer vision may be employed on a vehicle operating in an autonomous mode. In such applications, a camera may capture an image and/or a lidar may capture a point cloud and, based upon the image and/or point cloud, the vehicle operating in an autonomous mode may make control decisions (e.g., what speed to travel at, where to turn, when to stop, when to honk the horn, etc.).

SUMMARY

Example embodiments may be used to model environmental conditions (e.g., visibility; various weather conditions, such as precipitation; etc.) of a surrounding environment. For example, some embodiments may include a camera and a lidar device configured to capture data about the surrounding environment. The captured data may then be merged and processed by a computing device in order to characterize the environmental conditions of the surrounding environment. For instance, the computing device may identify high-intensity and low-intensity regions of the surrounding environment based on the captured data and, based on the high-intensity and low-intensity regions, determine one or more figures of merit used to characterize environmental conditions of the surrounding environment.

In a first aspect, a method is provided. The method includes capturing, using a camera, an image of a first field of view of a surrounding environment from a first perspective. The method also includes capturing, using a light detection and ranging (lidar) device, a point cloud of a second field of view of the surrounding environment from a second perspective. Each point in the point cloud indicates a range between the lidar device and the surrounding environment in a region of the surrounding environment corresponding to the respective point. Additionally, the method includes aligning, by a computing device, the image with the point cloud based on the first field of view, the second field of view, the first perspective, or the second perspective. Further, the method includes identifying, by the computing device, one or more high-intensity regions of the surrounding environment based on the aligned image or point cloud. In addition, the method includes identifying, by the computing device, one or more low-intensity regions of the surrounding environment based on the aligned image or point cloud. Yet further, the method includes determining, by the computing device, a first figure of merit that characterizes environmental conditions of the surrounding environment based on one or more intensity values of one or more portions of the image corresponding to at least one of the high-intensity regions of the surrounding environment. Even further, the method includes determining, by the computing device, a second figure of merit that characterizes environmental conditions of the surrounding environment by performing a fit based on: at least one intensity value of at least one portion of the image corresponding to at least one of the low-intensity regions of the surrounding environment; at least one distance value of at least one portion of the point cloud corresponding to at least one of the low-intensity regions of the surrounding environment; and the first figure of merit.

In a second aspect, a system is provided. The system includes a camera configured to capture an image of a first field of view of a surrounding environment from a first perspective. The system also includes a light detection and ranging (lidar) device configured to capture a point cloud of a second field of view of the surrounding environment from a second perspective. Each point in the point cloud indicates a range between the lidar device and the surrounding environment in a region of the surrounding environment corresponding to the respective point. Additionally, the system includes a computing device. The computing device is configured to align the image with the point cloud based on the first field of view, the second field of view, the first perspective, or the second perspective. The computing device is also configured to identify one or more high-intensity regions of the surrounding environment based on the aligned image or point cloud. Additionally, the computing device is configured to identify one or more low-intensity regions of the surrounding environment based on the aligned image or point cloud. Further, the computing device is configured to determine a first figure of merit that characterizes environmental conditions of the surrounding environment based on one or more intensity values of one or more portions of the image corresponding to at least one of the high-intensity regions of the surrounding environment. In addition, the computing device is configured to determine a second figure of merit that characterizes environmental conditions of the surrounding environment by performing a fit based on: at least one intensity value of at least one portion of the image corresponding to at least one of the low-intensity regions of the surrounding environment; at least one distance value of at least one portion of the point cloud corresponding to at least one of the low-intensity regions of the surrounding environment; and the first figure of merit.

In a third aspect, a non-transitory, computer-readable medium is provided. The non-transitory, computer-readable medium has instructions stored thereon. The instructions, when executed by a processor, cause the processor to execute a method. The method includes receiving an image of a first field of view of a surrounding environment from a first perspective. The image was captured using a camera. The method also includes receiving a point cloud of a second field of view of the surrounding environment from a second perspective. The point cloud was captured using a light detection and ranging (lidar) device. Each point in the point cloud indicates a range between the lidar device and the surrounding environment in a region of the surrounding environment corresponding to the respective point. Additionally, the method includes aligning the image with the point cloud based on the first field of view, the second field of view, the first perspective, or the second perspective. Further, the method includes identifying one or more high-intensity regions of the surrounding environment based on the aligned image or point cloud. In addition, the method includes identifying one or more low-intensity regions of the surrounding environment based on the aligned image or point cloud. Yet further, the method includes determining a first figure of merit that characterizes environmental conditions of the surrounding environment based on one or more intensity values of one or more portions of the image corresponding to at least one of the high-intensity regions of the surrounding environment. Still further, the method includes determining a second figure of merit that characterizes environmental conditions of the surrounding environment by performing a fit based on: at least one intensity value of at least one portion of the image corresponding to at least one of the low-intensity regions of the surrounding environment; at least one distance value of at least one portion of the point cloud corresponding to at least one of the low-intensity regions of the surrounding environment; and the first figure of merit.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 6A is a flow diagram of a modeling technique, according to example embodiments.

FIG. 6B is a flow diagram of a modeling technique, according to example embodiments.

FIG. 8 is a flowchart illustration of a method, according to example embodiments.

DETAILED DESCRIPTION

Figure 1:
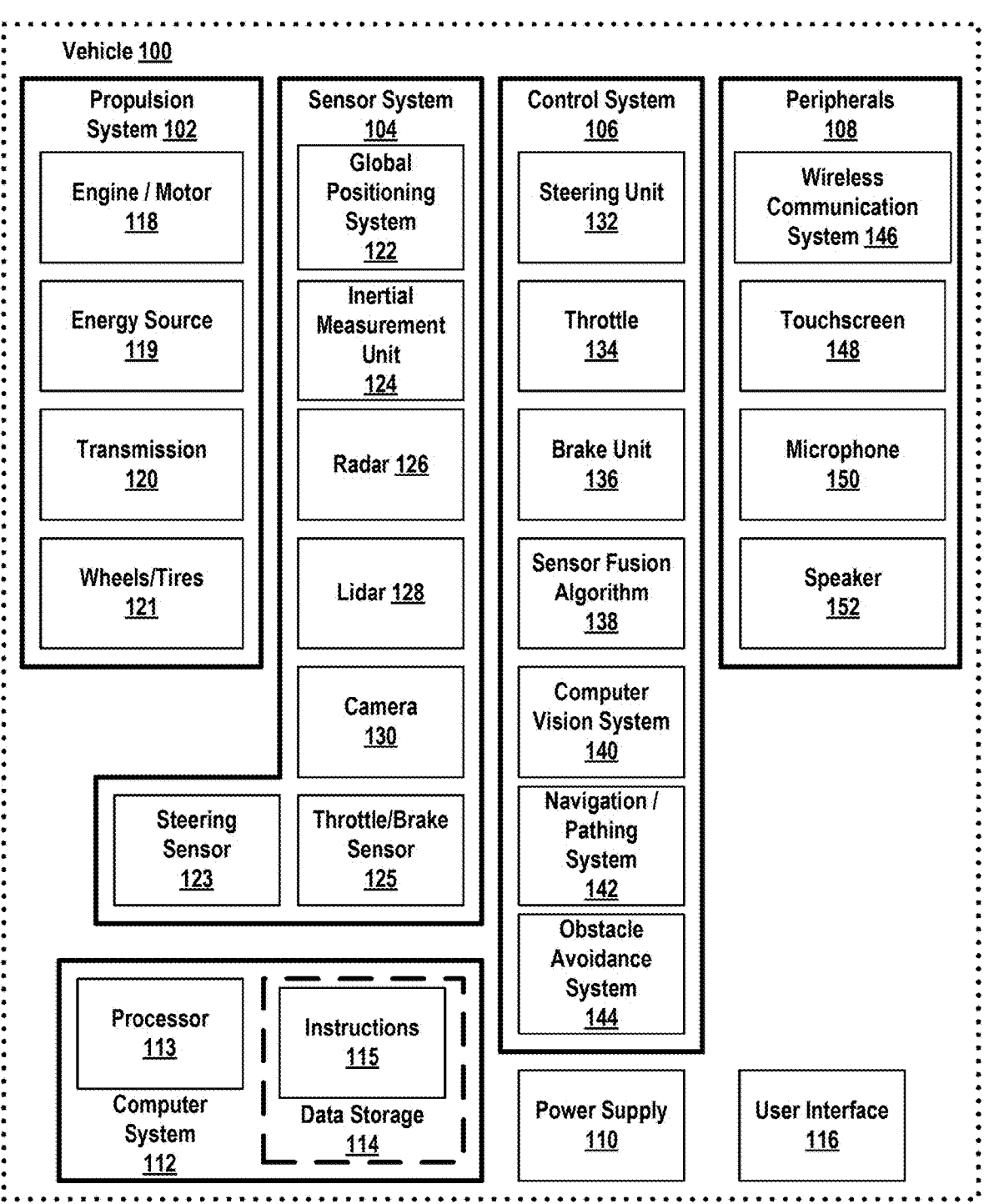
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, and terrain. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Throughout this disclosure the terms "high-intensity" and "low-intensity" are used. It is understood that "high-intensity" portions of an image or "high-intensity" regions of a surrounding environment represent regions of high light intensity. Likewise, "low-intensity" portions of an image or "low-intensity" regions of a surrounding environment represent regions of low light intensity.

In some cases, environmental conditions (e.g., weather conditions such as rain, fog, sleet, hail, snow, etc. or other conditions such as smoke, dust, etc.) may adversely affect the quality of images captured by a camera and/or the quality of point clouds captured by a lidar device. For example, the presence of fog can reduce visibility or meteorological optical range, which can inhibit the ability to use images and/or point clouds for computer vision. Further, it can be useful to quantify the effects of such environmental conditions (e.g., the amount of degradation of captured images or point clouds relative to situations where no such environmental conditions are present). Example embodiments described herein combine multiple channels with multiple imaging modalities in order to provide such a quantification. For example, techniques described herein may analyze one or more images captured with one or more cameras and one or more point clouds captured with one or more lidar devices in order to estimate one or more figures of merit related to the environmental conditions (e.g., weather conditions) of the surrounding environment.

In some embodiments, the techniques described herein may include a method. The method may include capturing an image of the surrounding environment using a camera and also capturing (e.g., substantially simultaneously with the image capture) a point cloud of the surrounding environment using a lidar device. The image and the point cloud may be aligned with one another (e.g., to account for differences in perspective, such as parallax effects; differences in field of view; and/or differences in capture timing).

Upon aligning the image and the point cloud, high-intensity regions of the surrounding environment may be identified based on the image or the point cloud. For example, regions in the surrounding environment that are very far away from the lidar device and/or camera (e.g., based on one or more range values in the point cloud), very reflective (e.g., based on one or more reflectivity values in the point cloud), and/or very bright (e.g., based on one or more intensity values in the image) may be identified as high-intensity regions in the surrounding environment. These regions may be used to determine a first figure of merit that characterizes environmental conditions (e.g., weather conditions) of the surrounding environment. For example, a model of the following form may be used to characterize environmental conditions:

$$I(x)=I_\infty(1-e^{-3(range(x)/eMOR)})$$

where $I(x)$ represents a light intensity at a particular region, $x$, of the surrounding environment (e.g., a region at a particular angular position relative to the camera and/or lidar device); $I_\infty$ represents a light intensity at infinite range (e.g., the maximum light intensity of the surrounding environment, such as the light intensity coming from the sun); $range(x)$ represents the distance to a particular region, $x$, of the surrounding environment (e.g., a region at a particular angular position relative to the camera and/or lidar device); and eMOR represents an estimated meteorological optical range (e.g., an isotropic estimated meteorological optical range, an angular-specific estimated meteorological optical range, and/or a wavelength-specific estimated meteorological optical range). When such a model is used, the first figure of merit that characterizes environmental conditions that is determined using the high-intensity regions may be $I_\infty$.

Low-intensity regions of the surrounding environment may also be identified based on the aligned image and/or point cloud. For example, regions in the surrounding environment that are not very reflective (e.g., based on one or more reflectivity values in the point cloud) and/or not very bright (e.g., based on one or more intensity values in the image) may be identified as low-intensity regions in the surrounding environment. In some embodiments, for instance, identifying low-intensity regions of the surrounding environment may include identifying portions of the image that have intensity values that are equal to or less than a threshold percentage (e.g., 0.01%, 0.1%, 1%, 5%, or 10%) of the intensity value identified for portions of the image that correspond to the high-intensity regions of the surrounding environment. Using the distance value(s) for the portions of the point cloud corresponding to the low-intensity regions (e.g., range(x)), the intensity value(s) for the portions of the image corresponding to the low-intensity regions (e.g., $I(x)$), and the determined first figure of merit (e.g., $I_\infty$), a second figure of merit that characterizes environmental conditions in the surrounding environment may be determined by performing a fit (e.g., by performing a regression analysis) to a model (e.g., the intensity model described by the equation above). Using the model described above, the determined second figure of merit may correspond to eMOR.

In the embodiments described above, the determined eMOR may represent an isotropic, time-independent, wavelength-independent meteorological optical range. However, other embodiments are also possible and are contemplated herein. For example, multiple images may be captured (e.g., from multiple perspectives or using different wavelength ranges). For instance, a red image, a green image, and a blue image could each be captured (or a red channel, a green channel, and a blue channel of a single image could be separated into multiple images). These images could be used to jointly fit to a model, thereby providing an eMOR that is applicable across various wavelengths. Additionally or alternatively, the images of different wavelengths could be analyzed separately, thereby providing multiple eMORs, each eMOR being applicable for a different wavelength range. Likewise, a near-infrared point cloud could be captured by the lidar device (e.g., based on the background near-infrared light in the surrounding environment) and used for a similar purpose to generate a near-infrared eMOR. In addition to or instead of wavelength-specific eMORs, images and/or point clouds with wider fields of view (e.g., 360° in azimuth or 180° in elevation) or different perspectives may be used to generate eMORs that are direction-specific (e.g., based on angular position) and/or a single, direction-independent eMOR that is more robustly determined. Still further, additionally or alternatively, images and/or point clouds captured during different time windows may be used to generate eMORs that are temporally specific and/or a single, temporally independent eMOR that is more robustly determined.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speed-bumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212,

214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
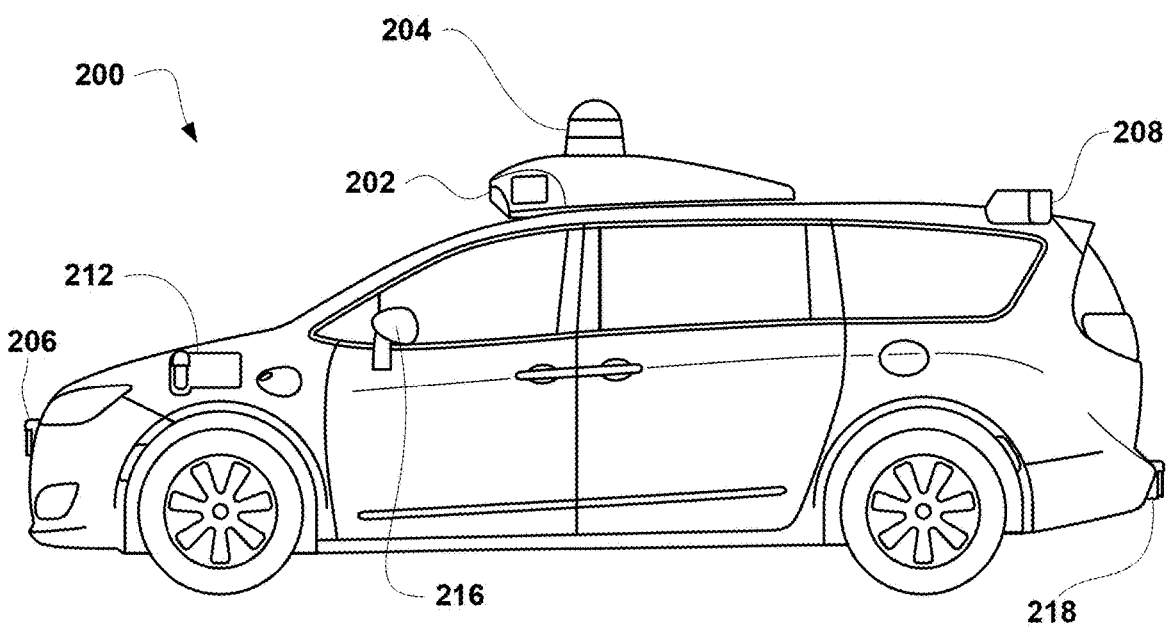
FIG. 2A is an illustration of a physical configuration of a vehicle, according to example embodiments.
Figure 2B:
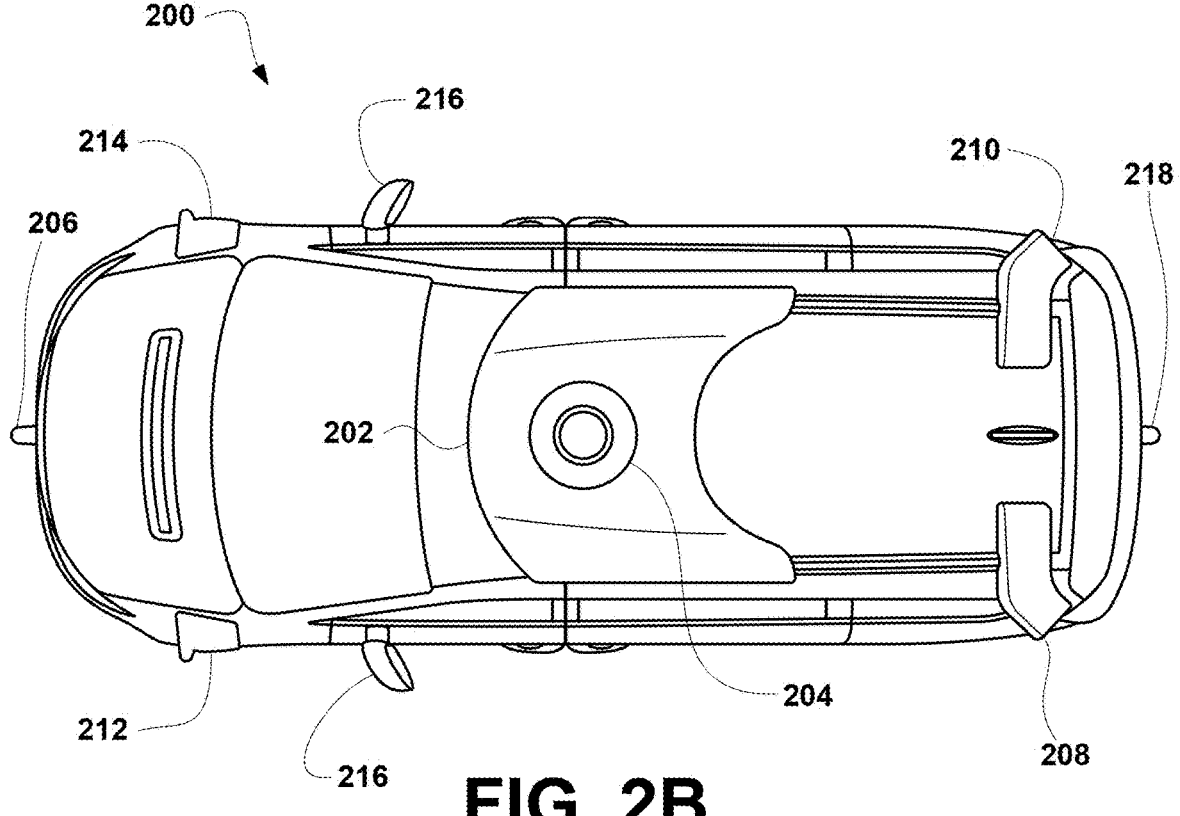
FIG. 2B is an illustration of a physical configuration of a vehicle, according to example embodiments.
Figure 2C:
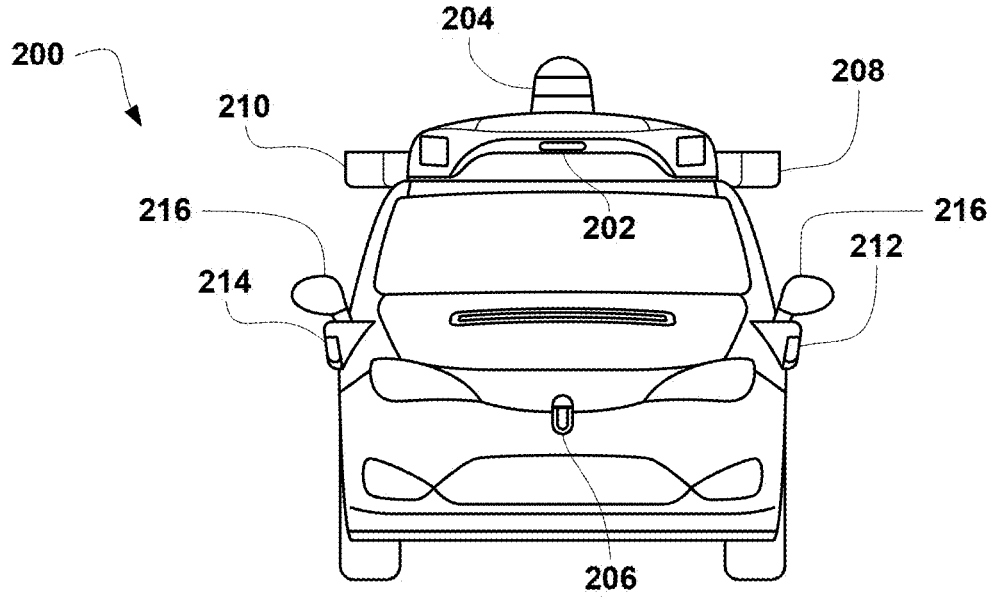
FIG. 2C is an illustration of a physical configuration of a vehicle, according to example embodiments.
Figure 2D:
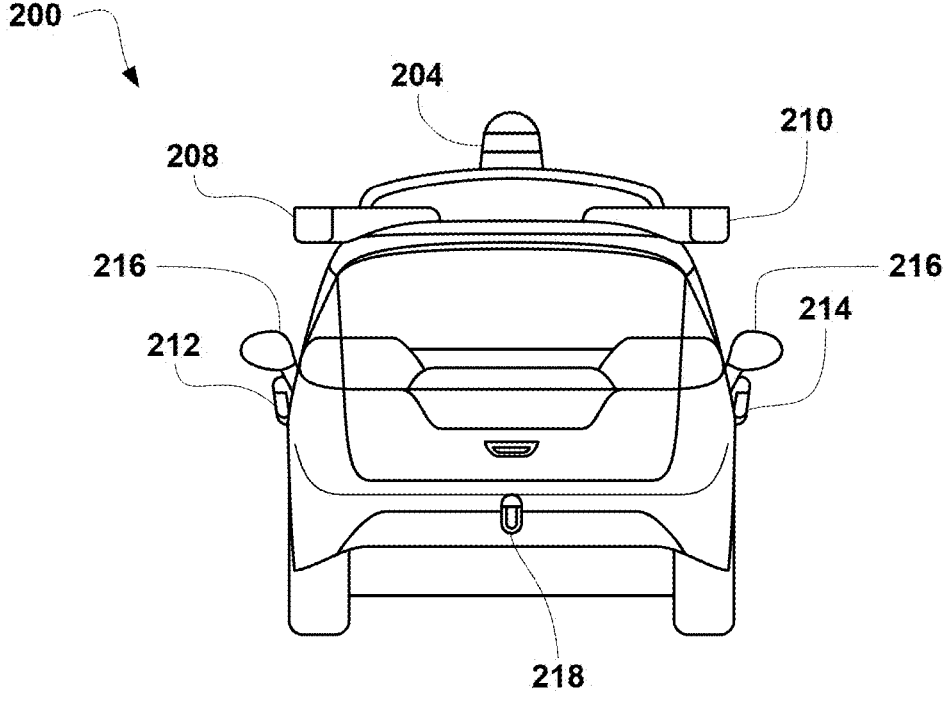
FIG. 2D is an illustration of a physical configuration of a vehicle, according to example embodiments.
Figure 2E:
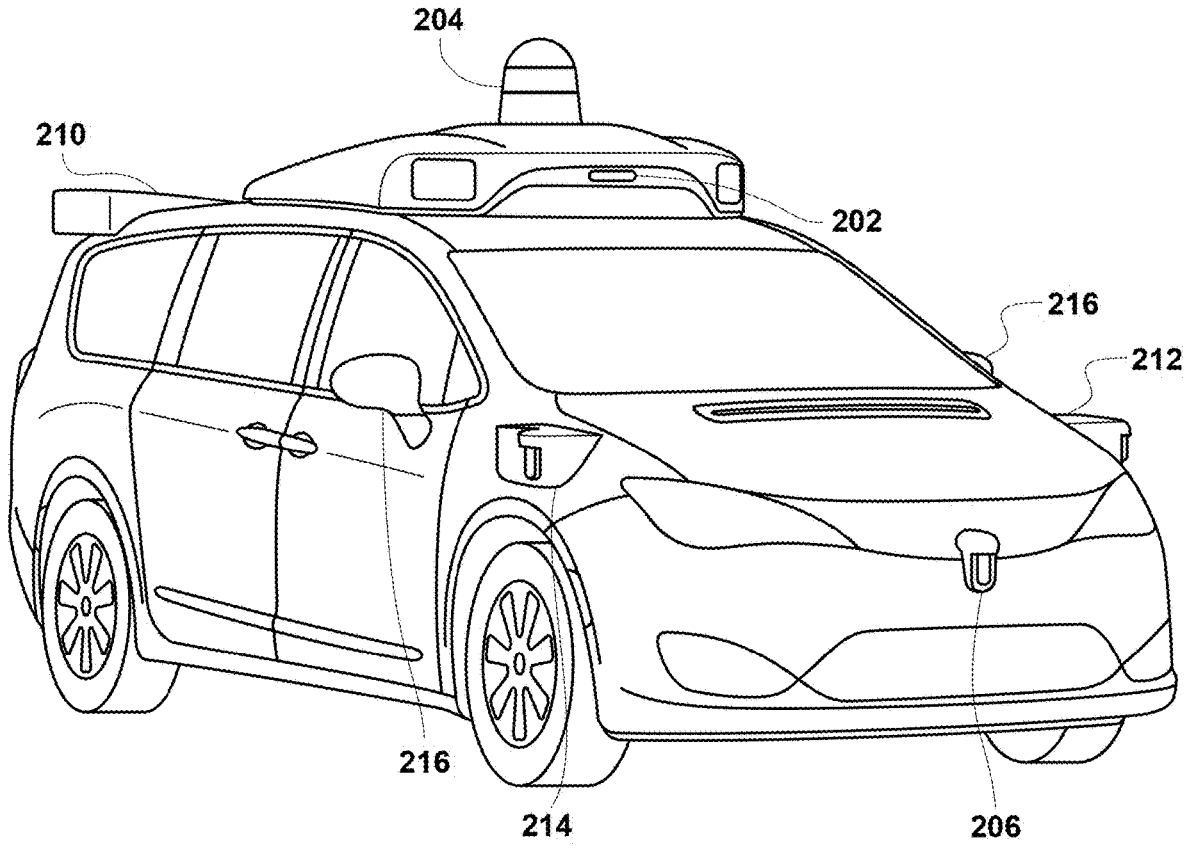
FIG. 2E is an illustration of a physical configuration of a vehicle, according to example embodiments.
Figure 2F:
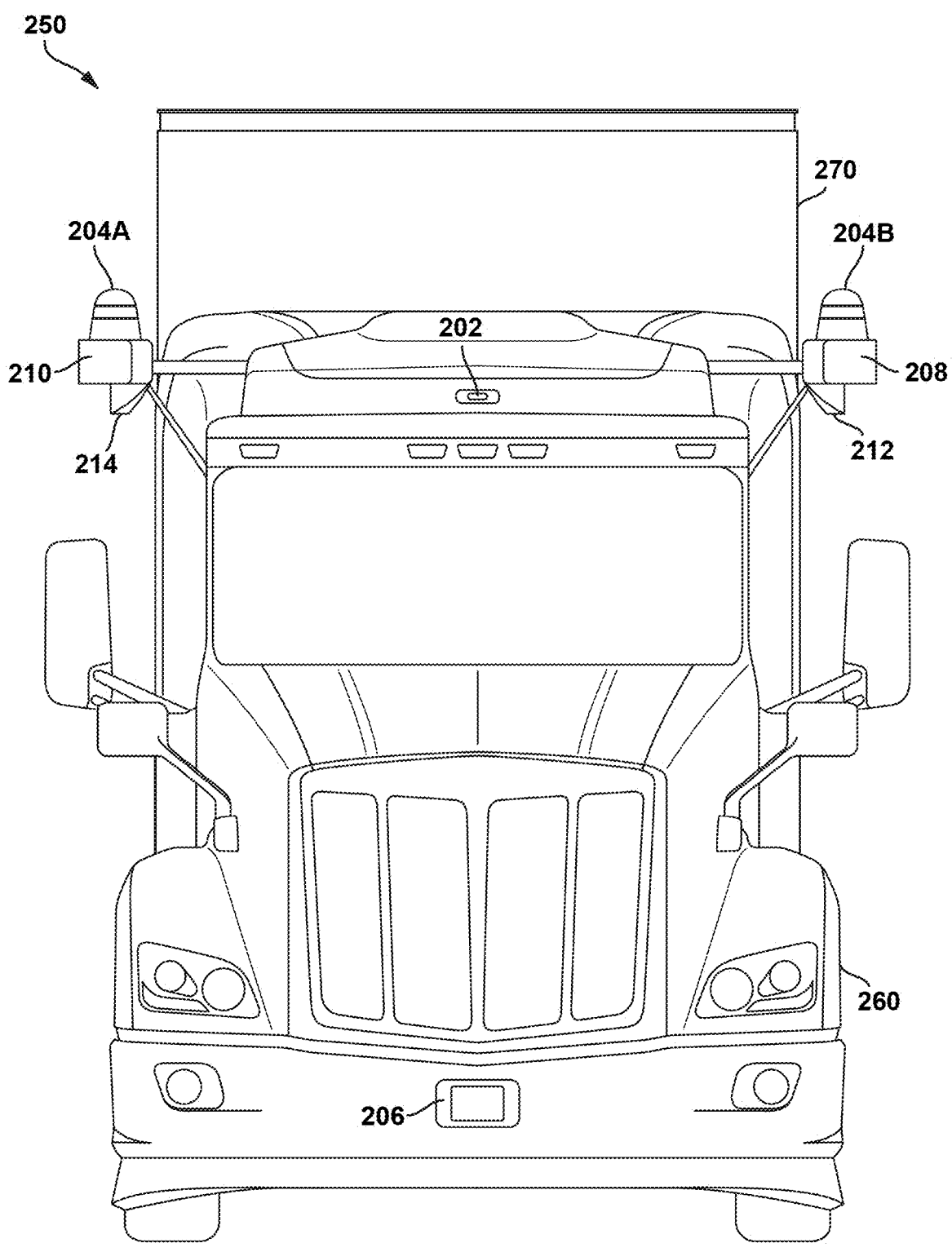
FIG. 2F is an illustration of a physical configuration of a vehicle, according to example embodiments.
Figure 2G:
FIG. 2G is an illustration of a physical configuration of a vehicle, according to example embodiments.
Figure 2H:
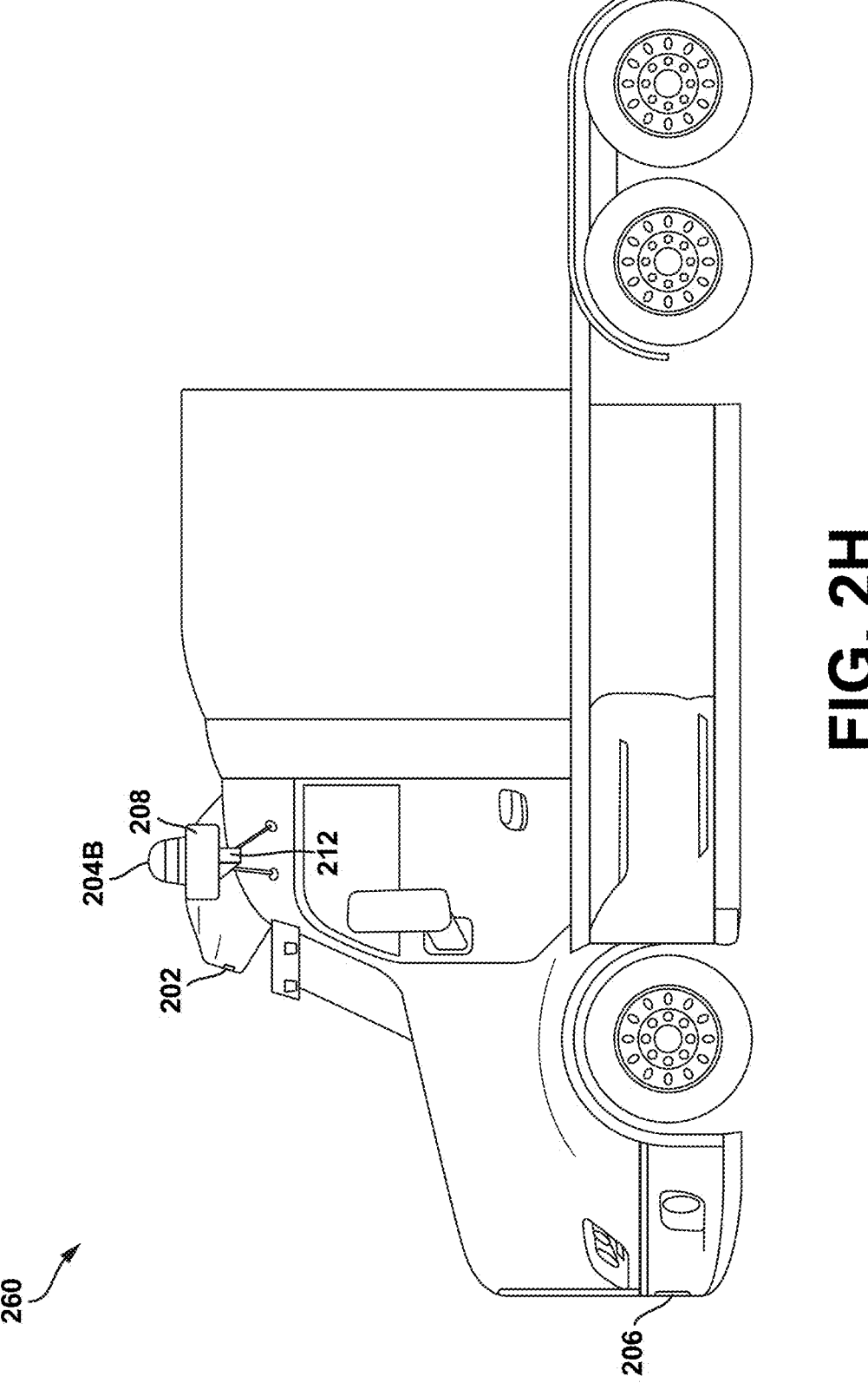
FIG. 2H is an illustration of a physical configuration of a vehicle, according to example embodiments.
Figure 2I:
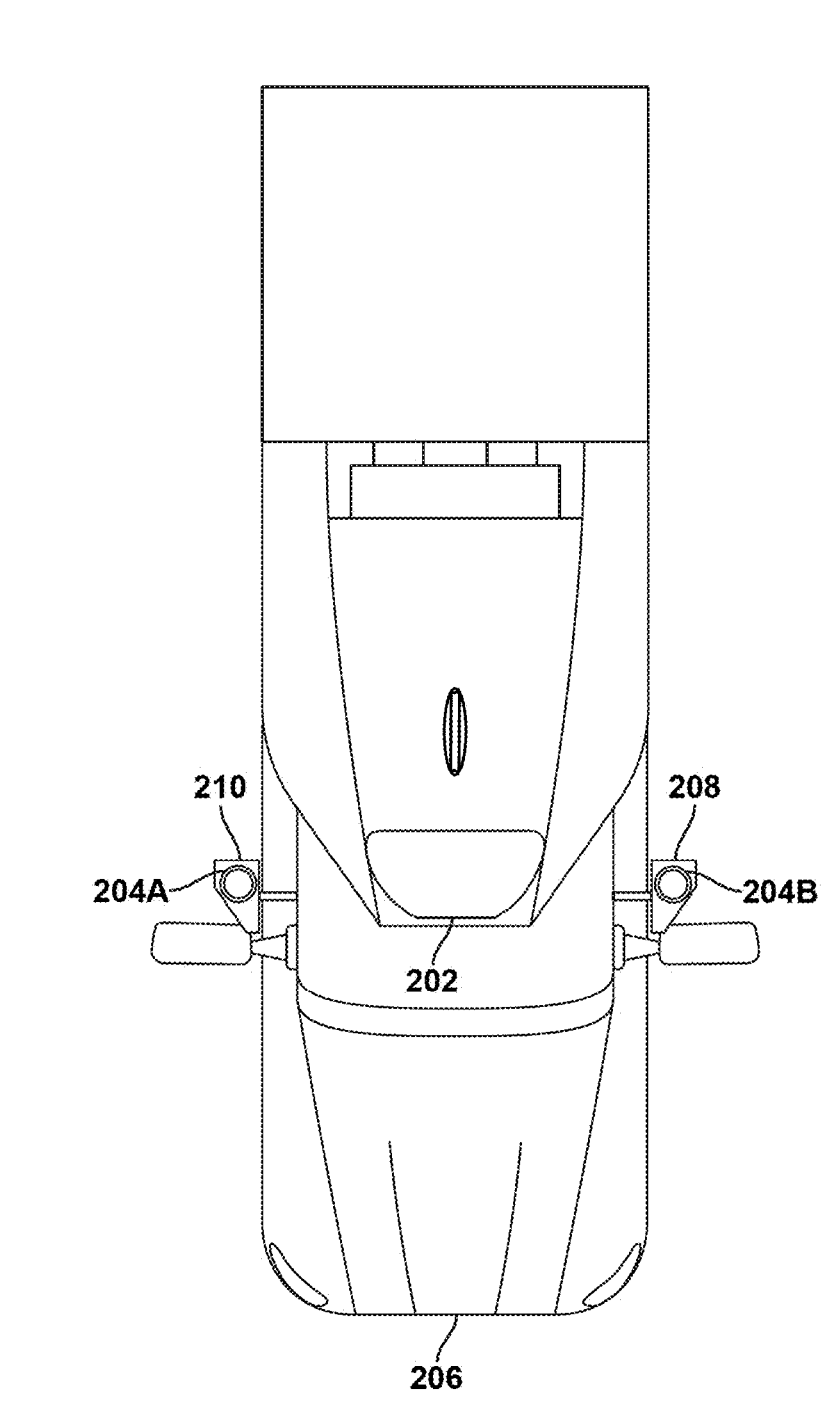
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
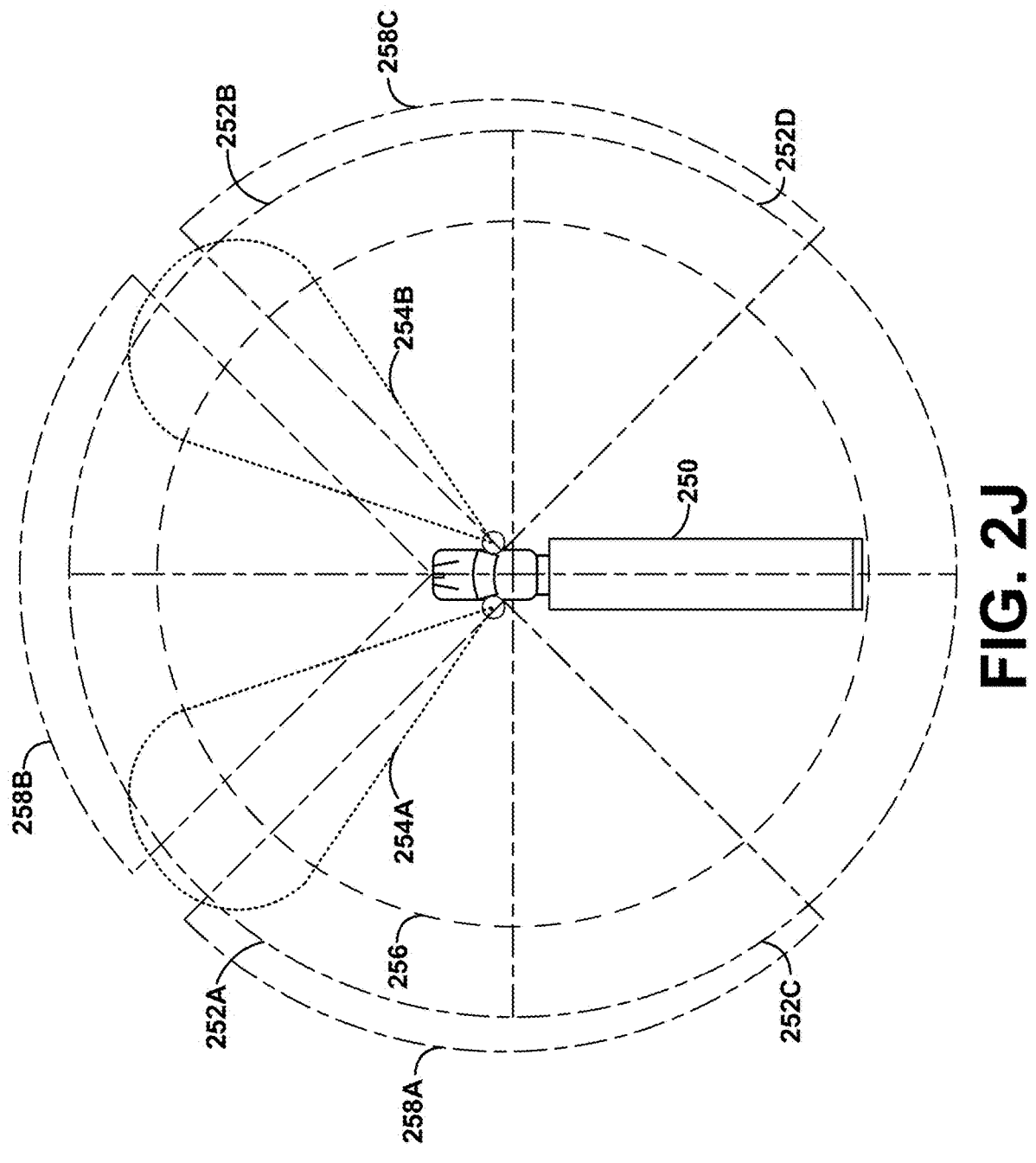
FIG. 2J is an illustration of a field of view for various sensors, according to example embodiments.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
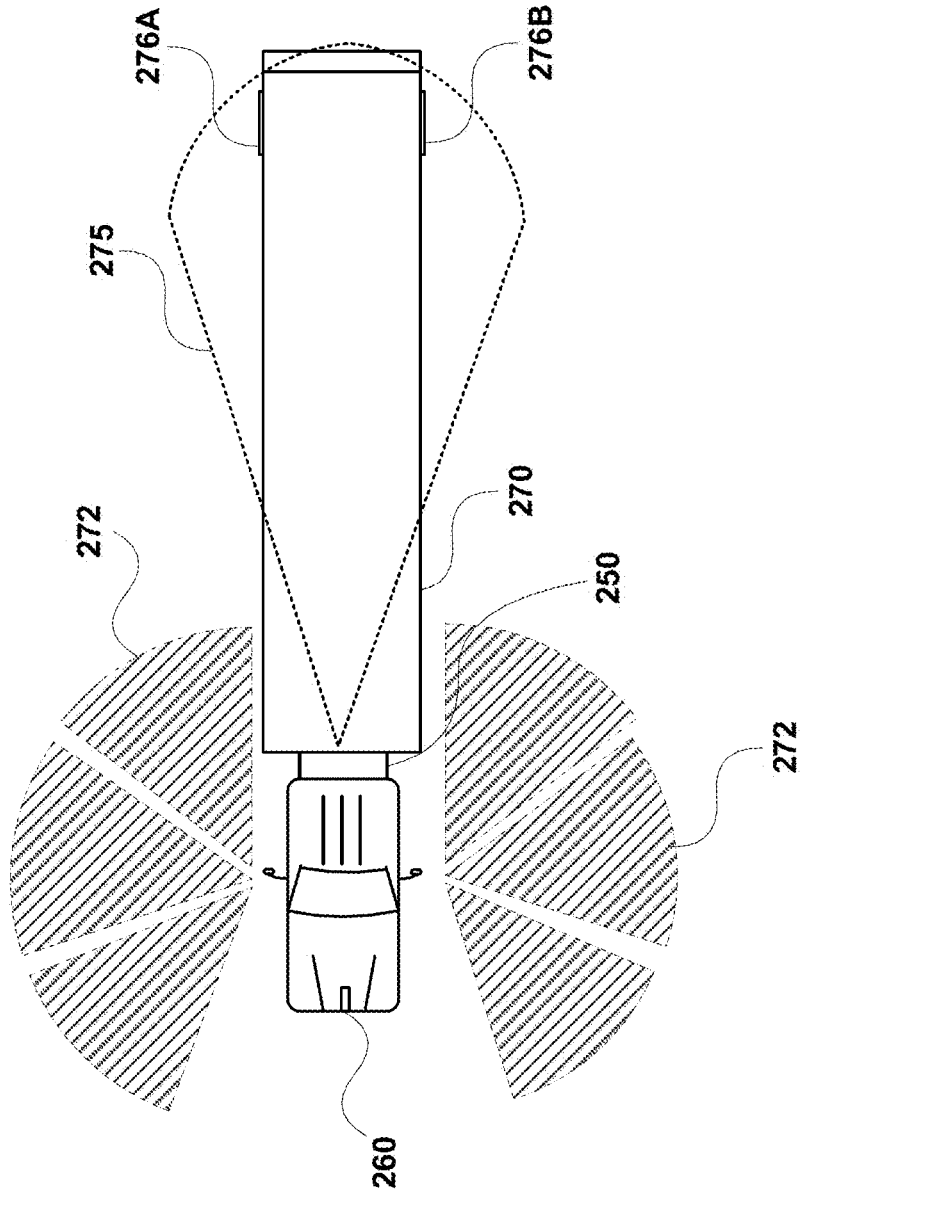
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
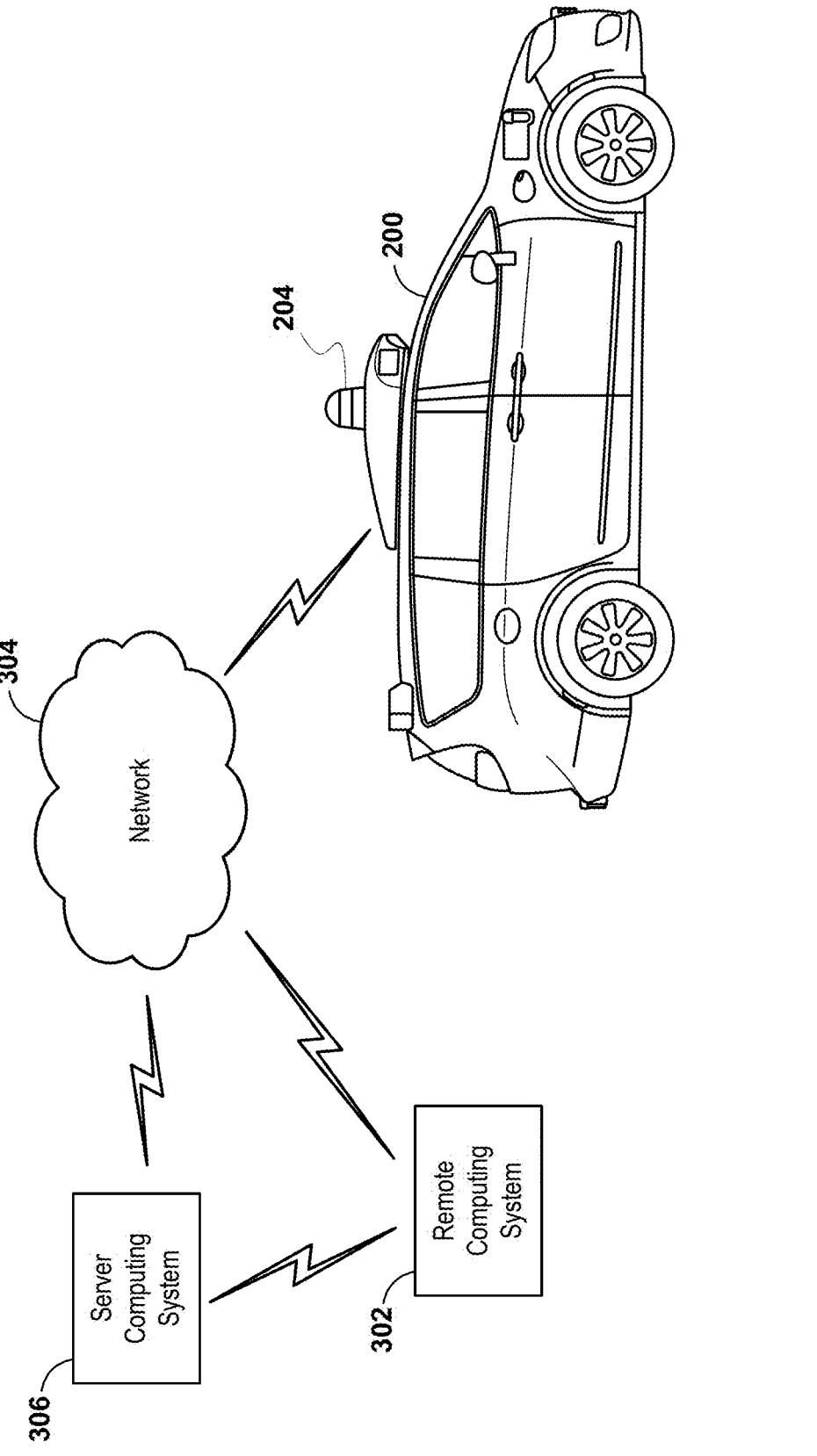
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
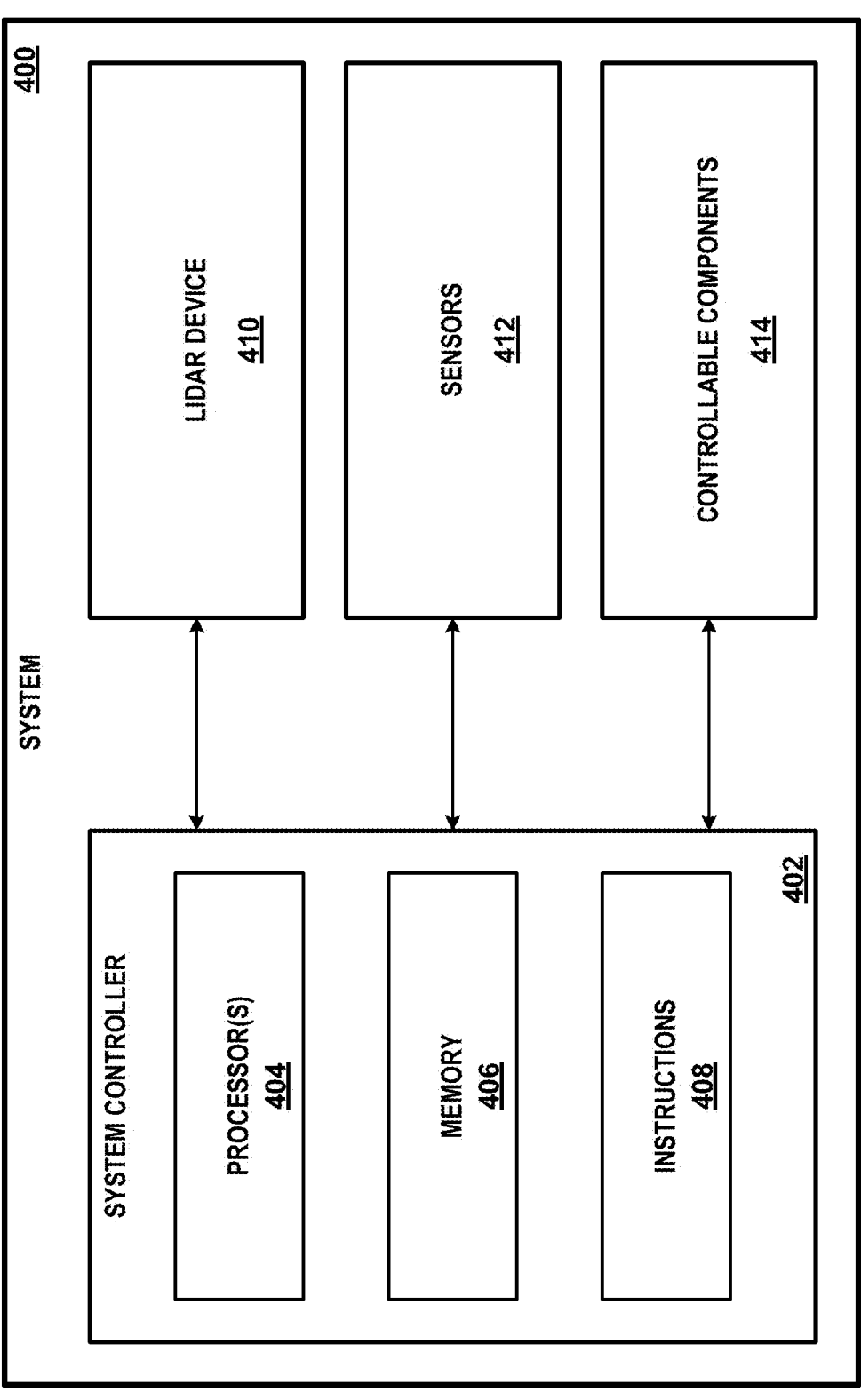
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, and proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
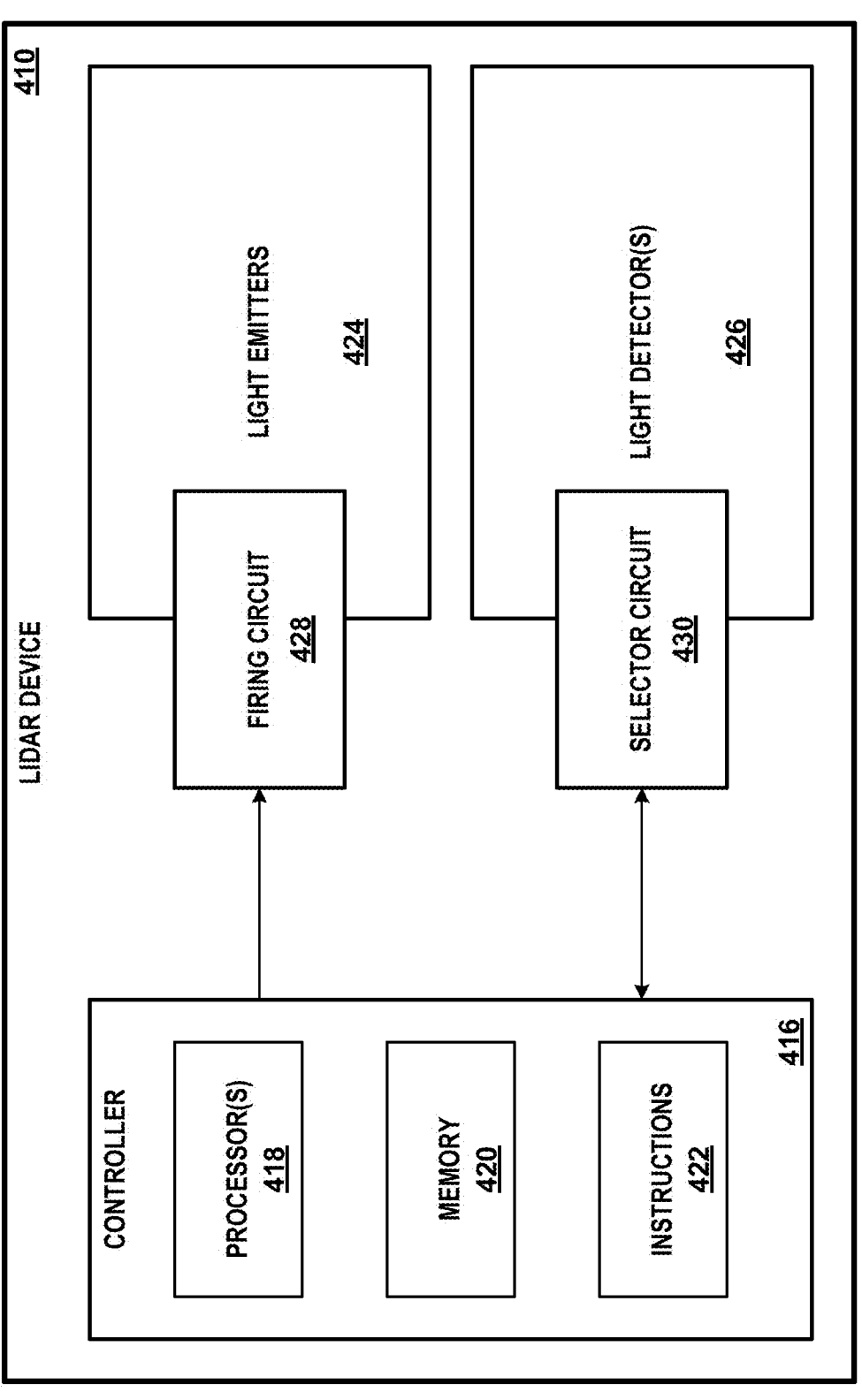
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

FIG. 5A is an illustration of a system 590 capturing data of a surrounding environment 550, according to example embodiments. The system 590 may include a camera 500 and a lidar device (e.g., the lidar device 410 shown and described with reference to FIGS. 4A and 4B). In some embodiments, the camera 500 may capture one or more images of the environment 550 (e.g., may capture images at different times) and the lidar device 410 may capture one or more point clouds (e.g., may capture point clouds at different times). The one or more point clouds may include a series of points corresponding to three-dimensional space in the surrounding environment 550. Further, each of the points within the point cloud may include data related to a range to a specific object in the surrounding environment 550 (e.g., an object from which light emitted from the lidar device 410 was reflected) and/or reflectivity of a specific object in the surrounding environment 550 (e.g., an object from which light emitted from the lidar device 410 was reflected). As illustrated, the camera 500 and the lidar device 410 of the system 590 might not be precisely collocated. As such, the camera 500 and the lidar device 410 may capture data about the surrounding environment 550 from slightly different perspectives. For example, the camera 500 may capture data from a first perspective and the lidar device 410 may capture data from a second perspective.

In some embodiments, the camera 500 may be the camera 130 of the sensor system 104 of the vehicle 100 as shown and described above with reference to FIG. 1. Further, the camera 500 may include one or more lens elements (not visible) housed within a lens holder 520 (e.g., lens barrel) of the camera 500. The camera 500 may also include an image sensor 504. In some embodiments, the camera 500 may include multiple channels (e.g., a red wavelength channel, a blue wavelength channel, and a green wavelength channel) that can be composited together to generate one or more images.

The image sensor 504 may include a CCD or a CMOS sensor. For example, the image sensor 504 may include an array of light-sensitive pixels configured to absorb light and provide electrical output based on the absorbed light. The electrical output of each of the light-sensitive pixels may then be stored (e.g., in a memory, such as a non-volatile memory) as a captured image (e.g., in a given file format, such as .JPEG, PNG, BMP, TIFF, .GIF, .PDF, RAW, or .EPS). In conjunction with the lens element(s) of the camera 500 and/or a rotation of the camera 500 relative to the surrounding environment 550, the field of view of images captured by the camera 500 may include an extended angular range in one or more directions (e.g., in azimuth and/or in elevation). For example, images captured by the camera 500 may include panoramic images (e.g., spanning 120° or more, such as 150°, 180°, 210°, 240°, 270°, 300°, 330°, or 360°, in azimuth).

The image sensor 504 may receive light from the environment 550 via the one or more lens elements housed within the lens holder 520 and/or via a mirror 502. In some embodiments, the camera 500 may also include additional components (e.g., shutter buttons, viewfinders, flashes, batteries, electronic storage for recording captured images, display screens, and selection buttons). Further, in some embodiments, the mirror 502 may be movable (e.g., the mirror 502 may rotate relative to the lens 510 such that light from the surrounding environment 550 can be selectively directed to a viewfinder of the camera 500 or to the image sensor 504 of the camera 500).

Figure 5:
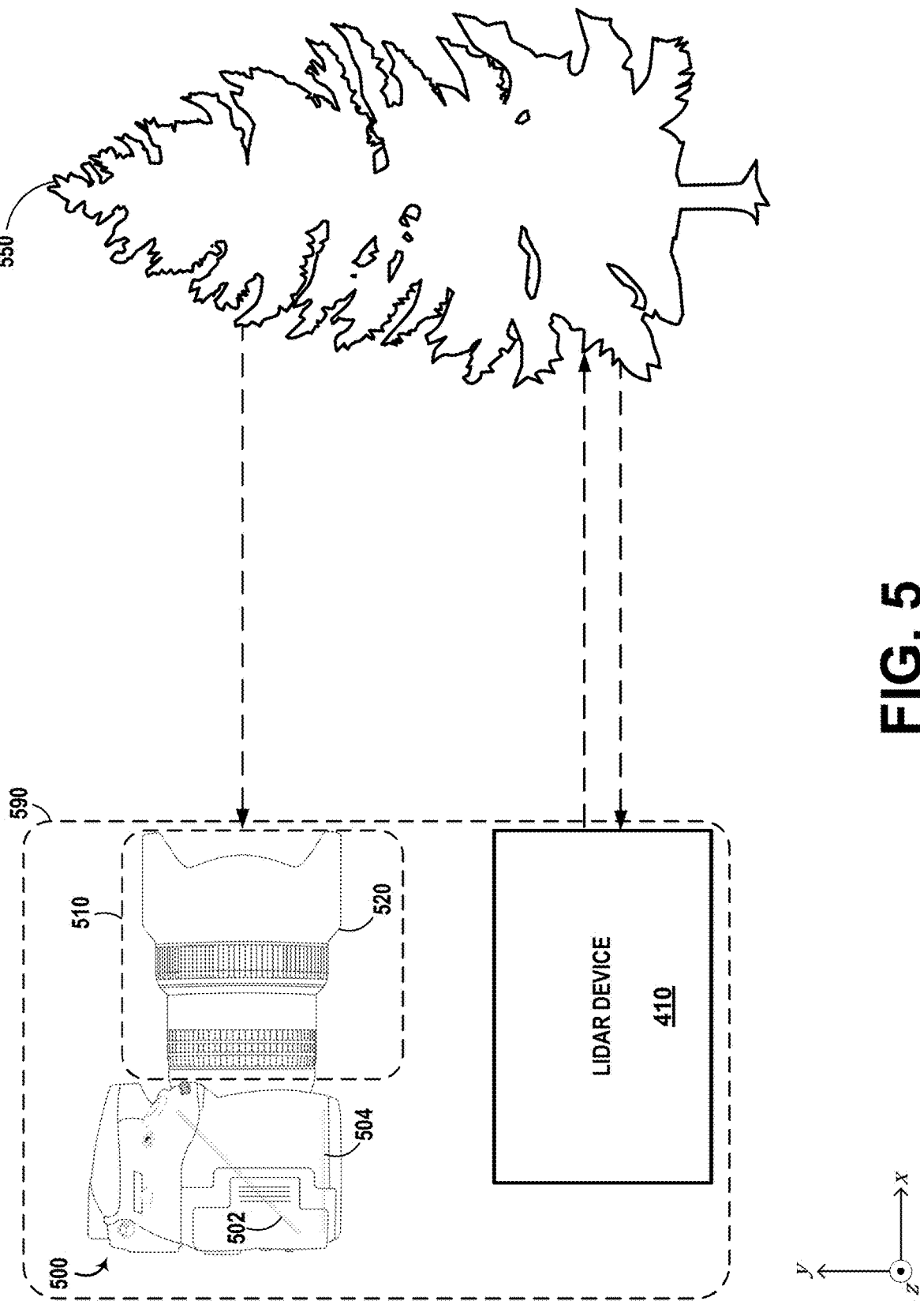
FIG. 5 is an illustration of a system sensing a surrounding environment, according to example embodiments.

It is to be understood that the surrounding environment 550 shown in FIG. 5 is provided merely for illustrative purposes and is not intended to imply that the surrounding environment 550 must include solely a tree or even must include a tree at all. Further, the surrounding environment 550 captured by the system 590 may include multiple objects. In some embodiments, for example, the surrounding environment 550 may include a series of objects surrounding a vehicle (e.g., a vehicle on which the system 590 is mounted) operating in an autonomous or semi-autonomous mode. For example, the surrounding environment 550 may include traffic signals, street lights, road surfaces, roadside signs, pedestrians, animals, plants, other vehicles, weather features (e.g., snow, sleet, hail, and rain), dust, bicycles, etc.

In some embodiments, one or more components of the system 590 may be controlled manually. For example, the lens holder 520 may be configured to rotate about its axis to modify the relative positions of the one or more lens elements within the lens holder 520, thereby adjusting a field of view and/or a zoom of the camera 500. Additionally or alternatively, the camera 500 may be rotated about an axis (e.g., about an axis parallel to the y-axis) and/or the lidar device 410 may be rotated about an axis (e.g., about an axis parallel to the y-axis) to adjust a field of view of the camera 500 and/or lidar device 410, respectively. Still further, the camera 500 may be translated (e.g., parallel to the x-z plane) and/or the lidar device 410 may be translated (e.g., parallel to the x-z plane) to adjust a perspective of the camera 500 and/or lidar device 410, respectively. In addition to or instead of being adjusted manually, one or more of the components of the system 590 may be electronically controlled (e.g., a system controller may adjust a zoom of the camera 500, exposure settings of the camera 500, a position of the camera 500, a position of the lidar device 410, exposure settings of the lidar device 410, orientation of the camera 500, orientation of the lidar device 410, etc.).

While a digital single-lens reflex (DSLR) camera is illustrated in FIG. 5, it is understood that FIG. 5 is solely provided as an example and other embodiments are contemplated herein. In alternative embodiments, other form factor cameras may be used. For example, in some embodiments, the camera 500 may only include an image sensor behind one or more lenses (e.g., a telecentric lens). Other arrangements are also possible. In some embodiments, for instance, the camera may include one or more optical filters (e.g., polarization filters, chromatic filters, and neutral-density filters) and/or one or more electronic stages and/or motors configured to adjust the position of one or more components of the camera. Further, in some embodiments, the camera 500 may be used for object detection and avoidance within a vehicle operating in an autonomous or semi-autonomous mode (e.g., like the camera 130 illustrated and described with reference to FIG. 1). It is understood that the techniques described herein may be applicable to any form factor of camera 500. For example, the techniques described herein are applicable to vehicle cameras (e.g., cameras used for object detection and avoidance, and backup cameras), webcams, cellphone cameras, DSLRs (as illustrated in FIG. 5), closed-circuit television cameras, high speed cameras, etc. Additionally, the techniques described herein may equally be applied to cameras that digitally record images as well as cameras that chemically record images (e.g., on film). Likewise, the techniques described herein are equally applicable to multiple types of lidar devices 410 (e.g., stationary lidar devices, lidar devices mounted on vehicles and used for object detection and avoidance, etc.).

FIG. 6A is a flow diagram of a modeling technique 602, according to example embodiments. The modeling technique 602 may be used to model environmental conditions (e.g., precipitation, visibility, pollution, etc.) in a surrounding environment (e.g., the environment 550 shown and described with reference to FIG. 5). As illustrated, the modeling technique 602 may begin by the camera 500 capturing an image 612 of the surrounding environment 550 and the lidar device 410 capturing a point cloud 614 of the surrounding environment 550. The image 612 and the point cloud 614 may be captured at the same time or substantially the same time (e.g., within 10 s, within 5 s, within 1 s, within 100 ms, within 10 ms, within 1 ms, within 100 µs, within 10 µs, or within 1 µs of one another).

The image 612 may be captured from a first perspective (e.g., based on one or more positions and one or more orientations of the camera 500 at the time of capture) and/or using a first field of view (e.g., based on characteristics of optics of the camera 500, such as lens focal length, aperture size, etc.). Further, the image 612 may be captured at a given wavelength (e.g., a wavelength within the red portion of the visible electromagnetic spectrum, a wavelength within the green portion of the visible electromagnetic spectrum, a wavelength within the blue portion of the visible electromagnetic spectrum, etc.). Alternatively, the image 612 may be a composite of multiple channels of the camera 500 captured at different wavelengths (e.g., the image 612 may be a red-green-blue (RGB) image generated based on detections of the red channel, green channel, and blue channel of the camera 500). Regardless, the image 612 may include an array of pixels, where each pixel indicates a light intensity (e.g., or multiple light intensities, such as a red intensity, a green intensity, and a blue intensity) corresponding to a position in the surrounding environment 550.

The point cloud 614 may be captured from a second perspective (e.g., based on one or more positions and one or more orientations of the lidar device 410 at the time of capture) and/or using a first field of view (e.g., based on characteristics of optics of the lidar device 410, such as lens focal length, aperture size, etc.). In some embodiments, for example, the lidar device 410 may include an array of light emitters and a corresponding array of light detectors. The light emitters and light detectors may be rotated relative to the surrounding environment 550 and may capture the point cloud 614 by repeatedly (e.g., in between and/or during rotation events) emitting a series of pulses and then detecting a corresponding series of detected light pulses. Further, the point cloud 614 may be captured at a given wavelength (e.g., a wavelength within the near-infrared portion of the electromagnetic spectrum). The wavelength used to capture the point cloud 614 may correspond, for example, to the wavelength of light emitted by one or more light emitters of the lidar device 410. Additionally, the point cloud 614 (e.g., each point in the point cloud) may include data related to the reflectivity of an object in the surrounding environment 550 and/or distance to (i.e., range of) an object in the surrounding environment 550.

As illustrated in FIG. 6A, upon capture of the image 612 and the point cloud 614, the modeling technique 602 may include an alignment 620 step. The alignment 620 may be performed by a computing device. For example, the computing device may receive the image 612 from the camera 500 and the point cloud 614 from the lidar device 410. Upon receiving the image 612 and the point cloud 614, the computing device may modify one or both of the image 612 and the point cloud 614 to align one to the other (e.g., to account for differences in perspective, such as parallax effects; differences in field of view shape and/or field of view size; and/or differences in capture timing). Modifying the image 612 or the point cloud 614 may involve cropping, downsampling, upsampling, interpolating, adjusting the aspect ratio of, scaling in one or more directions, rotating, adjusting to account for parallax, and/or applying one or more machine-learned models trained for alignment to one or both of the image 612 and/or the point cloud 614.

Aligning the image 612 to the point cloud 614 may allow one or more points in the point cloud 614 to be directly compared to one or more pixels in the image 612. For example, upon aligning the image 612 and the point cloud 614, a portion of an object in the surrounding environment 550 can be identified or analyzed using the image 612 and the same portion of the same object can be identified or analyzed using the point cloud 614. For instance, the light intensity of a portion of an object (e.g., within red, green, and/or blue portions of the visible electromagnetic spectrum) may be determined using the image 612 and then, after alignment, the distance (i.e., range) to and/or reflectivity (e.g., within the near-infrared portion of the electromagnetic spectrum) from that portion of the object may be determined using the point cloud 614.

As illustrated in FIG. 6A, after the alignment 620, the modeling technique 602 may include step 630, which may include identifying high-intensity and/or low-intensity regions of the surrounding environment 550. Such an identification may be performed, for example, by a computing device (e.g., a controller of the system 590 illustrated in FIG. 5). For example, the computing device may review the image 612 (e.g., post-alignment) pixel-by-pixel to identify one or more high-intensity regions of the surrounding environment 550 and/or one or more low-intensity regions of the surrounding environment 550. Alternatively, the computing device may review the image 612 (e.g., post-alignment) patch-by-patch to identify one or more high-intensity regions of the surrounding environment 550 and/or one or more low-intensity regions of the surrounding environment 550, where each patch is multiple pixels in size (e.g., two pixels, three pixels, four pixels, five pixels, six pixels, seven pixels, eight pixels, nine pixels, etc.). In various embodiments, patches may have different shapes (e.g., a triangular arrangement of pixels, a square arrangement of pixels, a rectangular arrangement of pixels, a pentagonal arrangement of pixels, a hexagonal arrangement of pixels, etc.). In various embodiments, the patches used by the computing device may each have the same size and shape as one another or may have different sizes and/or shapes for different positions within the image 612 (e.g., based on the objects in the image and/or based on the intensity distribution across the image 612).

In some embodiments, the computing device may identify one or more high-intensity regions of the surrounding environment 550 first (i.e., prior to identifying one or more low-intensity regions of the surrounding environment 550). Identifying the high-intensity region(s) of the surrounding environment 550 may include scanning the entire image 612 (e.g., post-alignment) to determine one or more portions of the image (e.g., one or more pixels or one or more patches) that have the greatest intensity value (e.g., within the 90th percentile, 95th percentile, 99th percentile, 99.5th percentile, 99.9th percentile, 99.99th percentile, etc.) within the image 612. Thereafter, identifying the low-intensity region(s) of the surrounding environment 550 may include scanning the image 612 (e.g., post-alignment) to determine one or more portions of the image 612 (e.g., one or more pixels or one or more patches) that have an intensity value that is equal to less than a threshold percentage (e.g., less than 25%, 10%, 5%, 2.5%, 1%, 0.5%, 0.25%, 0.1%, 0.05%, 0.025%, 0.01%, 0.005%, 0.0025%, or 0.001%) of the greatest intensity value within the image 612 (e.g., previously determined when identifying the high-intensity region(s) of the surrounding environment 550 based on the image 612). Additionally or alternatively, the point cloud 614 (e.g., post-alignment) may be used to identify one or more low-intensity regions of the surrounding environment 550. For example, the point cloud 614 may indicate a reflectivity of an object in the surrounding environment 550 that reflected a corresponding received lidar signal (e.g., at the given point in the point cloud 614). This reflectivity measure may be used to identify one or more low-intensity regions of the surrounding environment (e.g., in conjunction with or instead of the low-intensity portions of the image 612) by identifying (e.g., by the computing device) which portions of the point cloud 614 have a reflectivity value that is less than a threshold reflectivity. As another example, the point cloud 614 may indicate a range to an object in the surrounding environment 550 based on a corresponding received lidar signal (e.g., based on the time delay at the given point in the point cloud 614). This range measure may be used to identify one or more low-intensity regions of the surrounding environment (e.g., in conjunction with or instead of the low-intensity portions of the image 612) by identifying (e.g., by the computing device) which portions of the point cloud 614 have a range value that is greater than a threshold range. The threshold range may be stored in a non-transitory, computer-readable medium (e.g., 10 m, 25 m, 50 m, 100 m, 150 m, 250 m, etc.) or may be determined based on the span of ranges within the point cloud 614 (e.g., the 90th, 95th, 99th, 99.9th, 99.99th, etc. percentile of range values within the point cloud 614). When a point has an associated range value that is above the threshold, it may be determined that the object in the surrounding environment 550 is far enough away that it inherently reflects and/or emits a small amount of light toward the system (e.g., based on assumption of lambertian reflectance) and, therefore, represents a low-intensity region of the surrounding environment 550.

As illustrated in FIG. 6A, the high-intensity and/or low-intensity regions of the surrounding environment 550 that were identified at step 630 may be used to model environmental conditions (e.g., precipitation, visibility, fog levels, pollution levels, etc.) of the surrounding environment 550. For example, at step 640, the intensity of and/or the distance to (i.e., range of) the high-intensity regions and/or low-intensity regions of the surrounding environment 550 may be used (e.g., by a computing device, such as a controller of the system 590 illustrated in FIG. 5) to determine one or more figures of merit regarding the environmental conditions of the surrounding environment 550. In some embodiments, the high-intensity and/or low-intensity regions of the surrounding environment 550 may be used to perform a fit to a mathematical model and/or equation. For example, the following equation to model visibility may be used:

$$I(x) = I_\infty \left(1 - e^{-range(x)/eMOR}\right)$$

where I(x) represents a light intensity at a particular region of the surrounding environment 550 (e.g., at the region of the surrounding environment 550 that corresponds to pixel/patch x within the image 612 and/or point/patch x within the point cloud 614), $I_\infty$ is a figure of merit (e.g., a first figure of merit) that corresponds to the intensity at the maximum range from the system 590 (e.g., approximating infinity), eMOR is a figure of merit (e.g., a second figure of merit) that corresponds to the estimated meteorological optical range, and range(x) is the distance (i.e., range) at a particular region of the surrounding environment 550 (e.g., at the region of the surrounding environment 550 that corresponds to pixel/patch x within the image 612 and/or point/patch x within the point cloud 614).

In order to determine a first figure of merit (e.g., $I_\infty$), the computing device may use the one or more identified high-intensity regions of the surrounding environment 550. For example, the computing device may implement an assumption that the range(x)>>eMOR and, therefore, the equation reduces to $I(x) \approx I_\infty$. Hence, the intensity at the pixel/patch x within the image 612 that corresponds to the identified high-intensity regions of the surrounding environment 550 can be set equal to a first figure of merit (e.g., $I_\infty$). If multiple high-intensity regions are used (e.g., multiple pixels/patches within the image 612 are being considered), a statistical analysis can be performed to determine the first figure of merit. For example, an average of the intensity values for each of pixels/patches or a median of the intensity values for each of the pixels/patches may be used for the first figure of merit (e.g., $I_\infty$).

Thereafter, the computing device may use the determined first figure of merit (e.g., $I_\infty$) and the one or more identified low-intensity regions of the surrounding environment 550 to determine a second figure of merit (e.g., eMOR). For example, the computing device may use the range to the point/patch x within the point cloud 614 that corresponds to a low-intensity region of the surrounding environment 550 as range(x) and the intensity of the pixel/patch x within the image 612 that corresponds to the same low-intensity region of the surrounding environment 550 as I(x). Then, along with the equation above and the previously determined first figure of merit (e.g., $I_\infty$), a second figure of merit (e.g., eMOR) can be determined. In some embodiments, instead of using a single low-intensity region of the surrounding environment 550, multiple low-intensity regions of the surrounding environment 550 (e.g., and their corresponding pixels/patches x within the image 612 and/or points/patches x within the point cloud 614) may be considered. In such a case, a statistical analysis (e.g., a linear regression analysis) may be performed by the computing device (e.g., using multiple corresponding values of range(x) and I(x)) to determine a best fit second figure of merit (e.g., eMOR). The first figure of merit ($I_\infty$) may represent the light intensity (e.g., at a given wavelength or as an average among multiple detectable wavelengths) of a hypothetical point in the surrounding environment 550 that is located infinitely far away from the system 590. Likewise, the second figure of merit (eMOR) may represent an estimate of the meteorological optical range, which is a measure of visibility of the surrounding environment 550. In particular, meteorological optical range may represent the length of path in the atmosphere (e.g., measured in meters) required to reduce the luminous flux of a collimated beam from a light source (e.g., an incandescent lamp) to 5% of its original value. Hence, the second figure of merit (eMOR) may provide an indication of the presence of fog, pollution, particulates, etc. that may reduce visibility and/or detection capabilities.

In some embodiments, a scaling factor, α, may also be used. For example, the equation above may be modified to $I(x) = I_\infty(1 - e^{-\alpha \cdot range(x)/eMOR})$. The scaling factor may be used to ensure that an eMOR determined based on the modeling technique 602 may physically correspond to the canonical definition of meteorological optical range (e.g., a 95% reduction in luminous flux). Hence, in some embodiments, the scaling factor, α, may be equal to about 3 (i.e., −ln (0.05)).

Figure 6C:
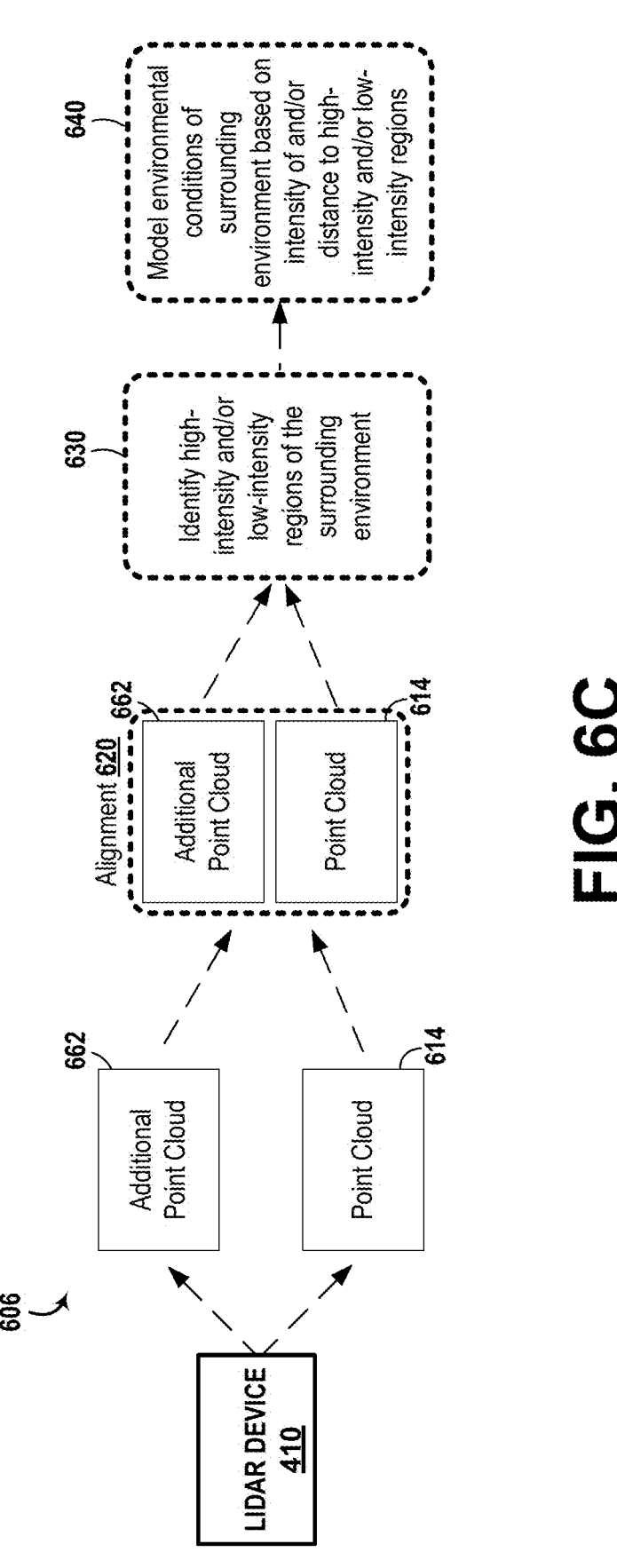
FIG. 6C is a flow diagram of a modeling technique, according to example embodiments.

While the above-described modeling technique 602 of FIG. 6A includes determining only one first figure of merit and one second figure of merit, it is understood that this is provided solely as an example and other embodiments are also possible and are contemplated here. In some embodiments, for instance, multiple first figures of merit and multiple corresponding second figures of merit could be determined (e.g., by performing additional steps in the modeling technique 602, by performing other modeling techniques described below with reference to FIGS. 6B and 6C, and/or by performing multiple instances of the modeling technique 602). For example, multiple images could be captured by the camera 500 and multiple corresponding point clouds 614 could be captured by the lidar device 410 at different points in time and, thereafter, a separate fit to the equation shown and described above ($I(x) = I_\infty (1 - e^{-range(x)/eMOR})$) could be performed for each of the points in time. In this way, figures of merit characterizing the environmental conditions of the surrounding environment 550 could be determined for different points in time. Further, by considering the figures of merit at the various points in time, the time evolution of the environmental conditions of the surrounding environment 550 (e.g., the time evolution of the weather) could be determined.

Additionally or alternatively, based on either a single image 612 in combination with a single point cloud 614 or multiple images in combination with multiple corresponding point clouds, different figures of merit characterizing the environmental conditions could be determined for different portions of the surrounding environment 550. For example, a fit could be performed for one region of the surrounding environment 550 (e.g., in one angular direction relative to the system 590 and/or relative to a direction of travel of a vehicle) to determine figures of merit and then another fit could be performed for another region of the surrounding environment 550 (e.g., in another angular direction relative to the system 590 and/or relative to a direction of travel of a vehicle). Performing multiple fits for multiple regions of the surrounding environment 550 may involve determining different high-intensity and low-intensity subregions within the corresponding regions (e.g., subregions having a high-intensity or low-intensity relative only to the other subregions in the region of the surrounding environment 550 being analyzed). In some embodiments, one or more figures of merit may be shared for some regions (e.g., angular directions) in the surrounding environment 550. For example, if applying a fit using the equation shown and described above (I(x)=I$_\infty$(1−e$^{-range(x)/eMOR}$)), the figure of merit that corresponds to the intensity at the maximum range from the system 590 (I$_\infty$) may be shared for models of all angular directions, whereas a figure of merit that corresponds to the estimated meteorological optical range (eMOR) may be direction-specific (i.e., a separate eMOR may be determined for different angular directions).

In some embodiments, different inputs may be used (e.g., to model the environmental conditions of the surrounding environment 550). For example, FIG. 6B is a flow diagram of a modeling technique 604, according to example embodiments. The modeling technique 604 of FIG. 6B may be similar to the modeling technique 602 shown and described with reference to FIG. 6A. However, unlike the modeling technique 602 of FIG. 6A, the modeling technique 604 of FIG. 6B may include the camera 500 capturing multiple images (e.g., multiple channels at different wavelengths). For example, as illustrated in FIG. 6B, the modeling technique 604 may include the camera 500 capturing a red image 652 (e.g., an image based on light within the red portion of the visible electromagnetic spectrum), a green image 654 (e.g., an image based on light within the green portion of the visible electromagnetic spectrum), and a blue image 656 (e.g., an image based on light within the blue portion of the visible electromagnetic spectrum). Further, the alignment 620 may include aligning the red image 652, the green image 654, and the blue image 656 with the point cloud 614 captured by the lidar device 410 and/or with one another.

Thereafter, step 630 of the modeling technique 604 may include identifying wavelength-specific high-intensity and/or low-intensity regions of the surrounding environment 550 based on the red image 652, the green image 654, the blue image 656, and/or the point cloud 614. For example, a computing device may identify high-intensity region(s) of the surrounding environment 550 by scanning the entire red image 652 (e.g., post-alignment) to determine one or more portions of the red image 652 (e.g., one or more pixels or one or more patches) that have the greatest intensity value within the red image 652. A similar process could additionally or alternatively be performed for the green image 654 or the blue image 656. Then, environmental conditions of the surrounding environment 550 may be characterized in step 640 using the high-intensity and/or low-intensity regions of the surrounding environment 550 identified in the respective images. For example, environmental conditions of the surrounding environment 550 may be characterized (e.g., using figures of merit) separately with respect to the various wavelengths. For instance, metrics characterizing the surrounding environment 550 as it appears in red wavelengths (e.g., visibility in the red portion of the visible electromagnetic spectrum) may be determined using the high-intensity and/or low-intensity regions identified based on the red image 652, metrics characterizing the surrounding environment 550 as it appears in green wavelengths (e.g., visibility in the green portion of the visible electromagnetic spectrum) may be determined using the high-intensity and/or low-intensity regions identified based on the green image 654, and/or metrics characterizing the surrounding environment 550 as it appears in blue wavelengths (e.g., visibility in the blue portion of the visible electromagnetic spectrum) may be determined using the high-intensity and/or low-intensity regions identified based on the blue image 654.

Alternatively, at step 630, high-intensity and/or low-intensity regions of the surrounding environment 550 may be determined using some combination of the red image

652, the green image 654, and the blue image 656. For example, the entire red image 652 (e.g., post-alignment) may be scanned to determine one or more portions of the red image 652 (e.g., one or more pixels or one or more patches) that have the greatest intensity value within the red image 652, the entire green image 654 (e.g., post-alignment) may be scanned to determine one or more portions of the green image 654 (e.g., one or more pixels or one or more patches) that have the greatest intensity value within the green image 654, and the entire blue image 656 (e.g., post-alignment) may be scanned to determine one or more portions of the blue image 656 (e.g., one or more pixels or one or more patches) that have the greatest intensity value within the blue image 656. Then, if the portions of greatest intensity value among the three images correspond to one another (i.e., correspond to the same region of the surrounding environment 550), those portion(s) may be used to identify a high-intensity region in the surrounding environment 550. Alternatively, a weighted average may be used to determine, based on the high-intensity and/or low-intensity portions of the images, where the high-intensity and/or low-intensity regions of the surrounding environment 550 are located.

In still other embodiments (e.g., after the alignment 620), a composite image of average intensities may be generated by calculating the average intensity for each pixel location (or each patch location) from among the red image 652, the green image 654, and the blue image 656. Then, based solely on this composite image, high-intensity and/or low-intensity regions of the surrounding environment 550 may be determined at step 630 by determining high-intensity or low-intensity portions of the composite image.

Regardless, after identifying high-intensity and/or low-intensity regions of the surrounding environment 550, composite metrics (e.g., composite figures of merit) may be determined based on the high-intensity and/or low-intensity regions. When modeling environmental conditions of the surrounding environment 550 using a mathematical model (e.g., I(x)=I$_\infty$(1−e$^{-range(x)/eMOR}$), as described above), one or more composite figures of merit may be determined. For example, a first figure of merit, such as a composite intensity at the maximum range from the system 590 (I$_\infty$) may be determined (e.g., based on the intensity value in the composite image corresponding to the high-intensity region of the surrounding environment 550 previously identified). Likewise, a second figure of merit, such as a composite estimated meteorological optical range (eMOR) may be determined (e.g., based on the intensity value(s) in the composite image and the range(x) in the point cloud 614 corresponding to the low-intensity region(s) of the surrounding environment 550 previously identified).

FIG. 6C is a flow diagram of a modeling technique 606, according to example embodiments. Like FIG. 6B, FIG. 6C shows a set of alternative inputs used to model environmental conditions of the surrounding environment 550. The modeling technique 606 of FIG. 6C may be similar to the modeling technique 602 shown and described with reference to FIG. 6A. However, unlike the modeling technique 602 of FIG. 6A, the modeling technique 606 of FIG. 6C may include the lidar device 410 capturing an additional point cloud 662. Further, the modeling technique 606 of FIG. 6C may not include the camera 500 or any images captured by the camera 500. The additional point cloud 662 may be captured using the detector(s) of the lidar device 410 (e.g., and, thus, may include detecting light within the near-infrared portion of the electromagnetic spectrum). For example, the lidar device 410 may capture the additional point cloud 662 by recording near-infrared background light from the surrounding environment 550 (e.g., without emitting light from light emitters of the lidar device 410). In various embodiments, the additional point cloud 662 and the point cloud 614 may have the same fields of view or different fields of view. Similarly, the additional point cloud 662 and the point cloud 614 may have been captured by the lidar device 410 from the same perspective or from different perspectives. Further, although the additional point cloud 662 and the point cloud 614 are shown in FIG. 6C as both being captured by the same lidar device 410, it is understood that in other embodiments, a different lidar device (e.g., with a different field of view, from a different perspective, with different optical capabilities, etc.) may capture the additional point cloud 662 than captured the point cloud 614.

As illustrated in FIG. 6C, like the modeling technique 602 shown and described with reference to FIG. 6A, the modeling technique 606 may include an alignment 620 of the additional point cloud 662 to the point cloud 614 (e.g., when the additional point cloud 662 is captured from a different perspective and/or with a different field of view than the point cloud 614). However, it is to be understood that such an alignment 620 might not be necessary if the lidar device 410 captures both the point cloud 614 and the additional point cloud 662 and: (i) does not move relative to the surrounding environment 550 between capturing the point cloud 614 and the additional point cloud 662 and (ii) does not adjust a field of view (e.g., by adjusting one or more optics of the lidar device 410) between capturing the point cloud 614 and the additional point cloud 662.

Upon aligning the additional point cloud 662 to the point cloud 614, and like the modeling technique 602 shown and described with reference to FIG. 6A, the modeling technique 606 may include a step 630 identifying high-intensity and/or low-intensity regions of the surrounding environment 550. Unlike the modeling technique 602 of FIG. 6C, though, the high-intensity and/or low-intensity regions of the surrounding environment 550 may not be identified based on the image 612 captured by the camera 500. Instead, identifying a high-intensity region of the surrounding environment 550 may include scanning the additional point cloud 662 (e.g., post-alignment) to determine one or more portions of the additional point cloud 662 (e.g., one or more points or one or more patches) that have the greatest intensity value (i.e., greatest detected light intensity, as determined by a detector of the lidar device 410) within the additional point cloud 662. Thereafter, identifying the low-intensity region(s) of the surrounding environment 550 may include scanning the additional point cloud 662 (e.g., post-alignment) to determine one or more portions of the additional point cloud 662 (e.g., one or more points or one or more patches) that have an intensity value that is equal to less than a threshold percentage (e.g., less than 25%, 10%, 5%, 2.5%, 1%, 0.5%, 0.25%, 0.1%, 0.05%, 0.025%, 0.01%, 0.005%, 0.0025%, or 0.001%) of the greatest intensity value within the additional point cloud 662 (e.g., previously determined when identifying the high-intensity region(s) of the surrounding environment 550 based on the additional point cloud 662).

Additionally or alternatively, the point cloud 614 (e.g., post-alignment) may be used to identify one or more low-intensity regions of the surrounding environment 550. For example, the point cloud 614 may indicate a reflectivity of an object in the surrounding environment 550 that reflected a corresponding received lidar signal (e.g., at the given point in the point cloud 614). This reflectivity measure may be used to identify one or more low-intensity regions of the surrounding environment (e.g., in conjunction with or instead of the low-intensity portions of the additional point cloud 662) by identifying (e.g., by the computing device) which portions of the point cloud 614 have a reflectivity value that is less than a threshold reflectivity.

As another example, the point cloud 614 may indicate a range to an object in the surrounding environment 550 based on a corresponding received lidar signal (e.g., the time delay at the given point in the point cloud 614). This range measure may be used to identify one or more low-intensity regions of the surrounding environment (e.g., in conjunction with or instead of the low-intensity portions of the image 612) by identifying (e.g., by the computing device) which portions of the point cloud 614 have a range value that is greater than a threshold range. The threshold range may be stored in a non-transitory, computer-readable medium (e.g., 10 m, 25 m, 50 m, 100 m, 150 m, 250 m, etc.) or may be determined based on the span of ranges within the point cloud 614 (e.g., the 90th, 95th, 99th, 99.9th, 99.99th, etc. percentile of range values within the point cloud 614). When a point has an associated range value that is above the threshold, it may be determined that the object in the surrounding environment 550 is far enough away that it inherently reflects and/or emits a small amount of light toward the system (e.g., based on assumption of lambertian reflectance) and, therefore, represents a low-intensity region of the surrounding environment 550.

Thereafter, and like the modeling technique 602 shown and described with reference to FIG. 6A, the modeling technique 606 may include a step 640 of modeling environmental conditions of the surrounding environment 550 based on intensity of and/or distance to high-intensity and/or low-intensity regions. For example, the intensity of the high-intensity region(s) of the surrounding environment 550 based on the additional point cloud 662, the intensity of the low-intensity region(s) of the surrounding environment 550 based on the additional point cloud 662, and the distance to (i.e., range of) those high-intensity and low-intensity regions of the surrounding environment 550 based on the point cloud 614 may be used in conjunction with the equation described above ($I(x)=I_\infty(1-e^{-range(x)/eMOR})$) to fit one or more figures of merit (e.g., $I_\infty$ and eMOR) that characterize the environmental conditions of the surrounding environment 550. In some sense, then, the modeling technique 606 illustrated in FIG. 6C may use the additional point cloud 662 as a stand-in for an image captured by the camera 500 (e.g., the image 612 shown and described with reference to FIG. 6A).

While multiple combinations of inputs and output metrics have been shown and described with respect to the modeling techniques 602, 604, 606 of FIGS. 6A-6C, it is to be understood that different combinations are also possible and are contemplated herein. For example, any combination of intensities from a red image (e.g., red image channel), intensities from a green image (e.g., green image channel), intensities from a blue image (e.g., blue image channel), near-infrared intensities from a point cloud, and reflectivities from a point cloud (e.g., one, two, three, four, or all five of these types of data) could be used to identify high-intensity and/or low-intensity regions of the surrounding environment 550. It is also understood that other wavelengths (e.g., other than red, green, blue, and near-infrared) could also be incorporated into the modeling technique (e.g., to determine high-intensity and/or low-intensity regions of the surrounding environment 550).

Further, it is understood that the modeling techniques 602, 604, 606 of FIGS. 6A-6C are provided solely as examples and that additional and/or alternative steps may be performed and/or one or more steps may be performed in a different order. In some embodiments, for example, portions of steps 630 and 640 may be intertwined. For example, in some embodiments, a high-intensity region of the surrounding environment 550 may be identified and then a first figure of merit that characterizes the surrounding environment 550 may be determined prior to the low-intensity regions of the surrounding environment 550 being identified. As another example, additional steps may be performed after step 640 (e.g., based on the modeled environmental conditions of the surrounding environment 550). For instance, once one or more figures of merit are determined (e.g., according to a fit to an equation, such as $I(x)=I_\infty(1-e^{-range(x)/eMOR})$), additional calculations may be performed based on the figures of merit. For example, an estimation of a functional visibility of the lidar device 410 may be determined based on one or more of the figures of merit and a mathematical model of the lidar device 410 (e.g., a model of emission properties of the lidar device 410). Additionally or alternatively, an estimation of a functional visibility of the camera 500 may be determined based on one or more of the figures of merit and a mathematical model of the camera 500 (e.g., a model of optical properties of the camera 500). Still further, post-processing could be performed on future images captured by the camera 500 based on the one or more determined figures of merit. For example, based on a decreased visibility (e.g., as characterized by one or more of the figures of merit), the contrast and/or color of images captured by the camera 500 could be modified to generate a synthetic image that represents an appearance of the surrounding environment as if no fog or other visibility-reducing agent were present.

In addition, certain control decisions (e.g., for a vehicle operating in an autonomous or semi-autonomous mode) may be informed and/or made based on the determined environmental conditions of the surrounding environment 550. For example, if the visibility is greater in one region of the surrounding environment 550 than another or if the precipitation is less in one region of the surrounding environment 550 than another, a vehicle may alter its navigation path (e.g., to move to regions with greater visibility or less precipitation).

Figure 7A:
FIG. 7A is an illustration of an image of a surrounding environment, according to example embodiments.

FIG. 7A is an illustration of an image (e.g., the image 612 shown and described with reference to the modeling technique 602 of FIG. 6A, such as the image 612 after the alignment 620 in which the image 612 and the point cloud 614 were aligned) of a surrounding environment (e.g., the surrounding environment 550 shown and described with reference to FIGS. 5-6C), according to example embodiments. For example, the image 612 may include a red channel captured at a red wavelength in the visible electromagnetic spectrum, a green channel captured at a green wavelength in the visible electromagnetic spectrum, and a blue channel captured at a blue wavelength in the visible electromagnetic spectrum.

Figure 7B:
FIG. 7B is an illustration of a point cloud of a surrounding environment, according to example embodiments.

FIG. 7B is an illustration of a point cloud (e.g., the point cloud 614 shown and described with reference to the modeling technique 602 of FIG. 6A, such as the point cloud 614 after the alignment 620 in which the image 612 and the point cloud 614 were aligned) of a surrounding environment (e.g., the surrounding environment 550 shown and described with reference to FIGS. 5-6C), according to example embodiments. The point cloud 614 may be generated by the lidar device 410 sensing near-infrared background light from the surrounding environment 550. Alternatively, the point cloud 614 may be generated by the lidar device 410 emitting light signals into the surrounding environment 550 and detecting reflections from objects in the surrounding environment. In some embodiments, each point in the point cloud 614 may include a range value (e.g., related to transit time of a light signal between emission and detection), a reflectivity value (e.g., corresponding to a reflectivity of an object in the surrounding environment 550 to which the respective point corresponds), and/or an intensity value (e.g., corresponding to a near-infrared light intensity, either of the background light from the surrounding environment 550 and/or of a signal emitted by the lidar device 410 and reflected from an object in the surrounding environment 550).

Figure 7C:
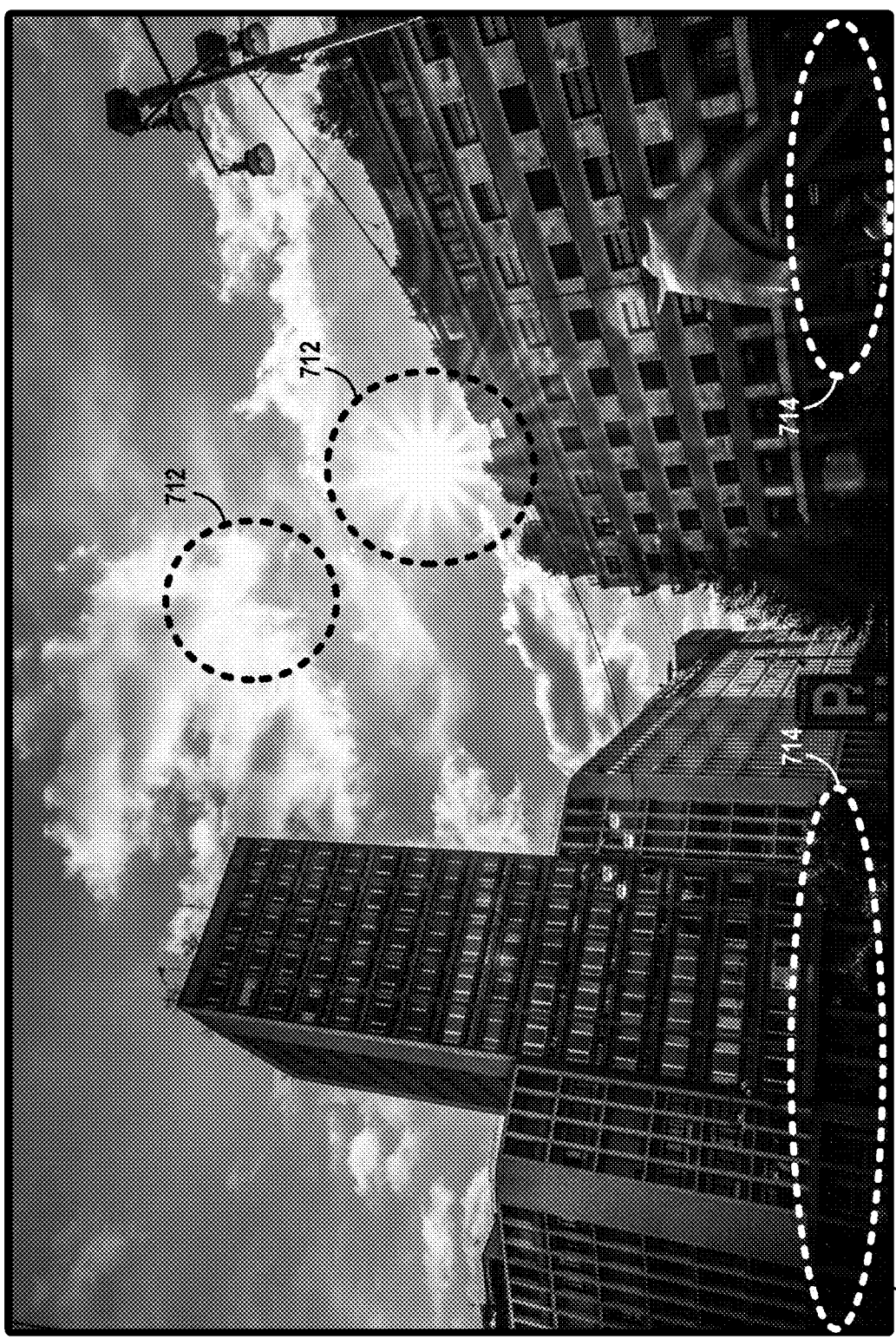
FIG. 7C is an illustration of high-intensity and low-intensity portions of a captured image, according to example embodiments.

FIG. 7C is an illustration of high-intensity portions 712 and low-intensity portions 714 of a captured image (e.g., the image 612 shown and described with reference to the modeling technique 602 of FIG. 6A, such as the image 612 after the alignment 620 in which the image 612 and the point cloud 614 were aligned), according to example embodiments. In some embodiments, the high-intensity portions 712 and the low-intensity portions 714 may be determined based on step 630 of modeling technique 602. Further, the high-intensity portions 712 and the low-intensity portions 714 of the captured image 612 may correspond, respectively, to high-intensity regions and low-intensity regions of a surrounding environment (e.g., the surrounding environment 550 shown and described with reference to FIGS. 5-6C).

FIG. 8 is a flowchart diagram of a method 800, according to example embodiments. In some embodiments, the method 800 may be performed using a system (e.g., the system 590 shown and described with reference to FIG. 5).

At block 802, the method 800 may include capturing, using a camera, an image of a first field of view of a surrounding environment from a first perspective.

At block 804, the method 800 may include capturing, using a light detection and ranging (lidar) device, a point cloud of a second field of view of the surrounding environment from a second perspective. Each point in the point cloud indicates a range between the lidar device and the surrounding environment in a region of the surrounding environment corresponding to the respective point.

At block 806, the method 800 may include aligning, by a computing device, the image with the point cloud based on the first field of view, the second field of view, the first perspective, or the second perspective.

At block 808, the method 800 may include identifying, by the computing device, one or more high-intensity regions of the surrounding environment based on the aligned image or point cloud.

At block 810, the method 800 may include identifying, by the computing device, one or more low-intensity regions of the surrounding environment based on the aligned image or point cloud.

At block 812, the method 800 may include determining, by the computing device, a first figure of merit that characterizes environmental conditions of the surrounding environment based on one or more intensity values of one or more portions of the image corresponding to at least one of the high-intensity regions of the surrounding environment.

At block 814, the method 800 may include determining, by the computing device, a second figure of merit that characterizes environmental conditions of the surrounding environment by performing a fit based on: at least one intensity value of at least one portion of the image corresponding to at least one of the low-intensity regions of the surrounding environment; at least one distance value of at least one portion of the point cloud corresponding to at least one of the low-intensity regions of the surrounding environment; and the first figure of merit.

In some embodiments of the method 800, performing the fit may include fitting data to an equation of the form of $I(x)=I_\infty(1-e^{-range(x)/eMOR})$, where $I(x)$ represents a light intensity at a particular region of the surrounding environment, the first figure of merit is $I_\infty$, and the second figure of merit is eMOR.

In some embodiments of the method 800, the image of the first field of view of the surrounding environment from the first perspective may be captured at a first wavelength. The first figure of merit and the second figure of merit may characterize environmental conditions of the surrounding environment for light transmitted at the first wavelength. The method 800 may also include capturing, using the camera, a second image of the first field of view of the surrounding environment from the first perspective. The second image of the first field of view of the surrounding environment from the first perspective may be captured at a second wavelength, and wherein the second wavelength is different from the first wavelength. Additionally, the method 800 may include aligning, by the computing device, the second image with the point cloud based on the first field of view, the second field of view, the first perspective, or the second perspective. Further, the method 800 may include identifying, by the computing device, one or more second high-intensity regions of the surrounding environment based on the aligned second image or point cloud. In addition, the method 800 may include identifying, by the computing device, one or more second low-intensity regions of the surrounding environment based on the aligned second image or point cloud. Yet further, the method 800 may include determining, by the computing device, a third figure of merit that characterizes environmental conditions of the surrounding environment for light transmitted at the second wavelength based on one or more intensity values of one or more portions of the second image corresponding to at least one of the second high-intensity regions of the surrounding environment. Even further, the method 800 may include determining, by the computing device, a fourth figure of merit that characterizes environmental conditions of the surrounding environment for light transmitted at the second wavelength by performing a second fit based on: at least one intensity value of at least one portion of the second image corresponding to at least one of the second low-intensity regions of the surrounding environment; at least one distance value of at least one portion of the point cloud corresponding to at least one of the second low-intensity regions of the surrounding environment; and the third figure of merit.

In some embodiments, the method 800 may include capturing, using the camera, a third image of the first field of view of the surrounding environment from the first perspective. The third image of the first field of view of the surrounding environment from the first perspective may be captured at a third wavelength, wherein the third wavelength is different from the first wavelength, and wherein the third wavelength is different from the second wavelength. The method 800 may also include aligning, by the computing device, the third image with the point cloud based on the first field of view, the second field of view, the first perspective, or the second perspective. Additionally, the method 800 may include identifying, by the computing device, one or more third high-intensity regions of the surrounding environment based on the aligned third image or point cloud. Further, the method 800 may include identifying, by the computing device, one or more third low-intensity regions of the surrounding environment based on the aligned third image or point cloud. In addition, the method 800 may include determining, by the computing device, a fifth figure of merit that characterizes environmental conditions of the surrounding environment for light transmitted at the third wavelength based on one or more intensity values of one or more portions of the third image corresponding to at least one of the third high-intensity regions of the surrounding environment. Still further, the method 800 may include determining, by the computing device, a sixth figure of merit that characterizes environmental conditions of the surrounding environment for light transmitted at the third wavelength by performing a third fit based on: at least one intensity value of at least one portion of the third image corresponding to at least one of the third low-intensity regions of the surrounding environment; at least one distance value of at least one portion of the point cloud corresponding to at least one of the third low-intensity regions of the surrounding environment; and the fifth figure of merit.

In some embodiments of the method 800, the first wavelength may be in the red portion of the visible electromagnetic spectrum, the second wavelength may be in the blue portion of the visible electromagnetic spectrum, and the third wavelength may be in the green portion of the visible electromagnetic spectrum.

In some embodiments of the method 800, the image of the first field of view of the surrounding environment from the first perspective may be captured at a first wavelength. The first figure of merit and the second figure of merit may characterize environmental conditions of the surrounding environment for light transmitted at the first wavelength. In some embodiments, the method 800 may include capturing, using the lidar device, a second point cloud of the second field of view of the surrounding environment from the second perspective. The second point cloud of the second field of view of the surrounding environment from the second perspective may be captured at a second wavelength, and wherein the second wavelength is different from the first wavelength. Additionally, the method 800 may include identifying, by the computing device, one or more second high-intensity regions of the surrounding environment based on the second point cloud or the point cloud. Further, the method 800 may include identifying, by the computing device, one or more second low-intensity regions of the surrounding environment based on the second point cloud or the point cloud. In addition, the method 800 may include determining, by the computing device, a third figure of merit that characterizes environmental conditions of the surrounding environment for light transmitted at the second wavelength based on one or more intensity values of one or more portions of the second point cloud corresponding to at least one of the second high-intensity regions of the surrounding environment. Still further, the method 800 may include determining, by the computing device, a fourth figure of merit that characterizes environmental conditions of the surrounding environment for light transmitted at the second wavelength by performing a second fit based on: at least one intensity value of at least one portion of the second point cloud corresponding to at least one of the second low-intensity regions of the surrounding environment; at least one distance value of at least one portion of the point cloud corresponding to at least one of the second low-intensity regions of the surrounding environment; and the third figure of merit.

In some embodiments of the method 800, the second wavelength may be in the near-infrared portion of the electromagnetic spectrum.

In some embodiments of the method 800, capturing the second point cloud of the second field of view of the surrounding environment from the second perspective may include recording, by the lidar device, near-infrared background light from the surrounding environment.

In some embodiments of the method 800, the image of the first field of view of the surrounding environment from the first perspective may be captured during a first time window. The point cloud of the second field of view of the surrounding environment from the second perspective may be captured during the first time window. The first figure of merit and the second figure of merit may characterize environmental conditions of the surrounding environment for light transmitted during the first time window. In some embodiments, the method 800 may also include capturing, using the camera, a second image of the first field of view of the surrounding environment from the first perspective. The second image of the first field of view of the surrounding environment from the first perspective may be captured during a second time window. The second time window may be different from the first time window. Additionally, the method 800 may include capturing, using the lidar device, a second point cloud of the second field of view of the surrounding environment from the second perspective. Each point in the second point cloud may indicate a range between the lidar device and the surrounding environment in the region of the surrounding environment corresponding to the respective point. The second point cloud of the second field of view of the surrounding environment from the second perspective may be captured during the second time window. Further, the method 800 may include aligning, by the computing device, the second image with the second point cloud based on the first field of view, the second field of view, the first perspective, or the second perspective. In addition, the method 800 may include identifying, by the computing device, one or more second high-intensity regions of the surrounding environment based on the aligned second image or second point cloud. Yet further, the method 800 may include identifying, by the computing device, one or more second low-intensity regions of the surrounding environment based on the aligned second image or second point cloud. Even further, the method 800 may include determining, by the computing device, a third figure of merit that characterizes environmental conditions of the surrounding environment for light transmitted during the second time window based on one or more intensity values of one or more portions of the second image corresponding to at least one of the second high-intensity regions of the surrounding environment. Still further, the method 800 may include determining, by the computing device, a fourth figure of merit that characterizes environmental conditions of the surrounding environment for light transmitted during the second time window by performing a second fit based on: at least one intensity value of at least one portion of the second image corresponding to at least one of the second low-intensity regions of the surrounding environment; at least one distance value of at least one portion of the second point cloud corresponding to at least one of the second low-intensity regions of the surrounding environment; and third figure of merit.

In some embodiments of the method 800, the second figure of merit may characterize the environmental conditions of the surrounding environment for a first angular direction with respect to the surrounding environment. The method 800 may also include determining, by the computing device, a third figure of merit that characterizes environmental conditions of the surrounding environment based on the performed fit. Additionally, the third figure of merit may characterize the environmental conditions of the surrounding environment for a second angular direction with respect to the surrounding environment.

In some embodiments of the method 800, the first field of view may be 360° in azimuth or the second field of view may be 360° in azimuth.

In some embodiments of the method 800, the one or more portions of the image corresponding to at least one of the low-intensity regions of the surrounding environment or at least one of the high-intensity regions of the surrounding environment may each be one pixel in size.

In some embodiments of the method 800, the one or more portions of the image corresponding to at least one of the low-intensity regions of the surrounding environment or at least one of the high-intensity regions of the surrounding environment may each be multiple pixels in size.

In some embodiments of the method 800, identifying the one or more high-intensity regions of the surrounding environment may include identifying one or more portions of the image having a greatest intensity value. Additionally, identifying the one or more low-intensity regions of the surrounding environment may include identifying one or more portions of the image having intensity values equal to less than a threshold percentage of the greatest intensity value.

In some embodiments of the method 800, the threshold percentage may be 1%.

In some embodiments of the method 800, each point in the point cloud may also indicate a reflectivity of an object in the surrounding environment that reflected a corresponding received lidar signal. Additionally, identifying the one or more low-intensity regions of the surrounding environment may include identifying one or more portions of the point cloud having a reflectivity value that is less than a threshold reflectivity.

In some embodiments of the method 800, identifying the one or more high-intensity regions of the surrounding environment may include identifying one or more portions of the point cloud having a range value that is greater than a threshold range.

In some embodiments of the method 800, aligning the image with the point cloud based on the first field of view, the second field of view, the first perspective or the second perspective may include: downsampling the image; downsampling the point cloud; adjusting an aspect ratio of the image; adjusting an aspect ratio of the point cloud; adjusting the image to account for parallax between the first perspective and the second perspective; or adjusting the point cloud to account for parallax between the first perspective and the second perspective.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

capturing, using a camera, an image of a first field of view of a surrounding environment from a first perspective;

capturing, using a light detection and ranging (lidar) device, a point cloud of a second field of view of the surrounding environment from a second perspective, wherein each point in the point cloud indicates a range between the lidar device and the surrounding environment in a region of the surrounding environment corresponding to the respective point;

aligning, by a computing device, the image with the point cloud based on the first field of view, the second field of view, the first perspective, or the second perspective;

identifying, by the computing device, one or more high-intensity regions of the surrounding environment based on the aligned image or point cloud;

identifying, by the computing device, one or more low-intensity regions of the surrounding environment based on the aligned image or point cloud;

determining, by the computing device, a first figure of merit that characterizes environmental conditions of the surrounding environment based on one or more intensity values of one or more portions of the image corresponding to at least one of the high-intensity regions of the surrounding environment; and determining, by the computing device, a second figure of merit that characterizes environmental conditions of the surrounding environment by performing a fit based on:

at least one intensity value of at least one portion of the image corresponding to at least one of the low-intensity regions of the surrounding environment;

at least one distance value of at least one portion of the point cloud corresponding to at least one of the low-intensity regions of the surrounding environment; and the first figure of merit.

2. The method of claim 1, wherein performing the fit comprising fitting data to an equation of the form of $I(x)=I_\infty(1-e^{-range(x)/eMOR})$, wherein $I(x)$ represents a light intensity at a particular region of the surrounding environment, wherein the first figure of merit is $I_\infty$, and wherein the second figure of merit is eMOR.

3. The method of claim 1, wherein the image of the first field of view of the surrounding environment from the first perspective is captured at a first wavelength, wherein the first figure of merit and the second figure of merit characterize environmental conditions of the surrounding environment for light transmitted at the first wavelength, and wherein the method further comprises:

capturing, using the camera, a second image of the first field of view of the surrounding environment from the first perspective, wherein the second image of the first field of view of the surrounding environment from the first perspective is captured at a second wavelength, and wherein the second wavelength is different from the first wavelength;

aligning, by the computing device, the second image with the point cloud based on the first field of view, the second field of view, the first perspective, or the second perspective;

identifying, by the computing device, one or more second high-intensity regions of the surrounding environment based on the aligned second image or point cloud;

identifying, by the computing device, one or more second low-intensity regions of the surrounding environment based on the aligned second image or point cloud;

determining, by the computing device, a third figure of merit that characterizes environmental conditions of the surrounding environment for light transmitted at the second wavelength based on one or more intensity values of one or more portions of the second image corresponding to at least one of the second high-intensity regions of the surrounding environment; and determining, by the computing device, a fourth figure of merit that characterizes environmental conditions of the surrounding environment for light transmitted at the second wavelength by performing a second fit based on:

at least one intensity value of at least one portion of the second image corresponding to at least one of the second low-intensity regions of the surrounding environment;

at least one distance value of at least one portion of the point cloud corresponding to at least one of the second low-intensity regions of the surrounding environment; and the third figure of merit.

4. The method of claim 3, further comprising:

capturing, using the camera, a third image of the first field of view of the surrounding environment from the first perspective, wherein the third image of the first field of view of the surrounding environment from the first perspective is captured at a third wavelength, wherein the third wavelength is different from the first wavelength, and wherein the third wavelength is different from the second wavelength;

aligning, by the computing device, the third image with the point cloud based on the first field of view, the second field of view, the first perspective, or the second perspective;

identifying, by the computing device, one or more third high-intensity regions of the surrounding environment based on the aligned third image or point cloud;

identifying, by the computing device, one or more third low-intensity regions of the surrounding environment based on the aligned third image or point cloud;

determining, by the computing device, a fifth figure of merit that characterizes environmental conditions of the surrounding environment for light transmitted at the third wavelength based on one or more intensity values of one or more portions of the third image corresponding to at least one of the third high-intensity regions of the surrounding environment; and determining, by the computing device, a sixth figure of merit that characterizes environmental conditions of the surrounding environment for light transmitted at the third wavelength by performing a third fit based on:

at least one intensity value of at least one portion of the third image corresponding to at least one of the third low-intensity regions of the surrounding environment;

at least one distance value of at least one portion of the point cloud corresponding to at least one of the third low-intensity regions of the surrounding environment; and the fifth figure of merit.

5. The method of claim 4, wherein the first wavelength is in the red portion of the visible electromagnetic spectrum, wherein the second wavelength is in the blue portion of the visible electromagnetic spectrum, and wherein the third wavelength is in the green portion of the visible electromagnetic spectrum.

6. The method of claim 1, wherein the image of the first field of view of the surrounding environment from the first perspective is captured at a first wavelength, wherein the first figure of merit and the second figure of merit characterize environmental conditions of the surrounding environment for light transmitted at the first wavelength, and wherein the method further comprises:

capturing, using the lidar device, a second point cloud of the second field of view of the surrounding environment from the second perspective, wherein the second point cloud of the second field of view of the surrounding environment from the second perspective is captured at a second wavelength, and wherein the second wavelength is different from the first wavelength;

identifying, by the computing device, one or more second high-intensity regions of the surrounding environment based on the second point cloud or the point cloud;

identifying, by the computing device, one or more second low-intensity regions of the surrounding environment based on the second point cloud or the point cloud;

determining, by the computing device, a third figure of merit that characterizes environmental conditions of the surrounding environment for light transmitted at the second wavelength based on one or more intensity values of one or more portions of the second point cloud corresponding to at least one of the second high-intensity regions of the surrounding environment; and determining, by the computing device, a fourth figure of merit that characterizes environmental conditions of the surrounding environment for light transmitted at the second wavelength by performing a second fit based on:

at least one intensity value of at least one portion of the second point cloud corresponding to at least one of the second low-intensity regions of the surrounding environment;

at least one distance value of at least one portion of the point cloud corresponding to at least one of the second low-intensity regions of the surrounding environment; and the third figure of merit.

7. The method of claim 6, wherein the second wavelength is in the near-infrared portion of the electromagnetic spectrum.

8. The method of claim 6, wherein capturing the second point cloud of the second field of view of the surrounding environment from the second perspective comprises recording, by the lidar device, near-infrared background light from the surrounding environment.

9. The method of claim 1, wherein the image of the first field of view of the surrounding environment from the first perspective is captured during a first time window, wherein the point cloud of the second field of view of the surrounding environment from the second perspective is captured during the first time window, wherein the first figure of merit and the second figure of merit characterize environmental conditions of the surrounding environment for light transmitted during the first time window, and wherein the method further comprises:

capturing, using the camera, a second image of the first field of view of the surrounding environment from the first perspective, wherein the second image of the first field of view of the surrounding environment from the first perspective is captured during a second time window, and wherein the second time window is different from the first time window;

capturing, using the lidar device, a second point cloud of the second field of view of the surrounding environment from the second perspective, wherein each point in the second point cloud indicates a range between the lidar device and the surrounding environment in the region of the surrounding environment corresponding to the respective point, and wherein the second point cloud of the second field of view of the surrounding environment from the second perspective is captured during the second time window;

aligning, by the computing device, the second image with the second point cloud based on the first field of view, the second field of view, the first perspective, or the second perspective;

identifying, by the computing device, one or more second high-intensity regions of the surrounding environment based on the aligned second image or second point cloud;

identifying, by the computing device, one or more second low-intensity regions of the surrounding environment based on the aligned second image or second point cloud;

determining, by the computing device, a third figure of merit that characterizes environmental conditions of the surrounding environment for light transmitted during the second time window based on one or more intensity values of one or more portions of the second image corresponding to at least one of the second high-intensity regions of the surrounding environment; and determining, by the computing device, a fourth figure of merit that characterizes environmental conditions of the surrounding environment for light transmitted during the second time window by performing a second fit based on:

at least one intensity value of at least one portion of the second image corresponding to at least one of the second low-intensity regions of the surrounding environment;

at least one distance value of at least one portion of the second point cloud corresponding to at least one of the second low-intensity regions of the surrounding environment; and the third figure of merit.

10. The method of claim 1, wherein the second figure of merit characterizes the environmental conditions of the surrounding environment for a first angular direction with respect to the surrounding environment, wherein the method further comprises determining, by the computing device, a third figure of merit that characterizes environmental conditions of the surrounding environment based on the performed fit, and wherein the third figure of merit characterizes the environmental conditions of the surrounding environment for a second angular direction with respect to the surrounding environment.

11. The method of claim 1, wherein:

the first field of view is 360° in azimuth; or the second field of view is 360° in azimuth.

12. The method of claim 1, wherein the one or more portions of the image corresponding to at least one of the low-intensity regions of the surrounding environment or at least one of the high-intensity regions of the surrounding environment are each one pixel in size.

13. The method of claim 1, wherein the one or more portions of the image corresponding to at least one of the low-intensity regions of the surrounding environment or at least one of the high-intensity regions of the surrounding environment are each multiple pixels in size.

14. The method of claim 1, wherein identifying the one or more high-intensity regions of the surrounding environment comprises identifying one or more portions of the image having a greatest intensity value, and wherein identifying the one or more low-intensity regions of the surrounding environment comprises identifying one or more portions of the image having intensity values equal to less than a threshold percentage of the greatest intensity value.

15. The method of claim 14, wherein the threshold percentage is 1%.

16. The method of claim 1, wherein each point in the point cloud also indicates a reflectivity of an object in the surrounding environment that reflected a corresponding received lidar signal, and wherein identifying the one or more low-intensity regions of the surrounding environment comprises identifying one or more portions of the point cloud having a reflectivity value that is less than a threshold reflectivity.

17. The method of claim 1, wherein identifying the one or more high-intensity regions of the surrounding environment comprises identifying one or more portions of the point cloud having a range value that is greater than a threshold range.

18. The method of claim 1, wherein aligning the image with the point cloud based on the first field of view, the second field of view, the first perspective or the second perspective comprises:

downsampling the image;

downsampling the point cloud;

adjusting an aspect ratio of the image;

adjusting an aspect ratio of the point cloud;

adjusting the image to account for parallax between the first perspective and the second perspective; or adjusting the point cloud to account for parallax between the first perspective and the second perspective.

19. A system comprising:

a camera configured to capture an image of a first field of view of a surrounding environment from a first perspective;

a light detection and ranging (lidar) device configured to capture a point cloud of a second field of view of the surrounding environment from a second perspective, wherein each point in the point cloud indicates a range between the lidar device and the surrounding environment in a region of the surrounding environment corresponding to the respective point;

a computing device configured to:

align the image with the point cloud based on the first field of view, the second field of view, the first perspective, or the second perspective;

identify one or more high-intensity regions of the surrounding environment based on the aligned image or point cloud;

identify one or more low-intensity regions of the surrounding environment based on the aligned image or point cloud;

determine a first figure of merit that characterizes environmental conditions of the surrounding environment based on one or more intensity values of one or more portions of the image corresponding to at least one of the high-intensity regions of the surrounding environment; and determine a second figure of merit that characterizes environmental conditions of the surrounding environment by performing a fit based on:

at least one intensity value of at least one portion of the image corresponding to at least one of the low-intensity regions of the surrounding environment;

at least one distance value of at least one portion of the point cloud corresponding to at least one of the low-intensity regions of the surrounding environment; and the first figure of merit.

20. A non-transitory, computer-readable medium having instructions stored thereon, wherein the instructions, when executed by a processor, cause the processor to execute a method comprising:

receiving an image of a first field of view of a surrounding environment from a first perspective, wherein the image was captured using a camera;

receiving a point cloud of a second field of view of the surrounding environment from a second perspective, wherein the point cloud was captured using a light detection and ranging (lidar) device, and wherein each point in the point cloud indicates a range between the lidar device and the surrounding environment in a region of the surrounding environment corresponding to the respective point;

aligning the image with the point cloud based on the first field of view, the second field of view, the first perspective, or the second perspective;

identifying one or more high-intensity regions of the surrounding environment based on the aligned image or point cloud;

identifying one or more low-intensity regions of the surrounding environment based on the aligned image or point cloud;

determining a first figure of merit that characterizes environmental conditions of the surrounding environment based on one or more intensity values of one or more portions of the image corresponding to at least one of the high-intensity regions of the surrounding environment; and determining a second figure of merit that characterizes environmental conditions of the surrounding environment by performing a fit based on:

at least one intensity value of at least one portion of the image corresponding to at least one of the low-intensity regions of the surrounding environment;

at least one distance value of at least one portion of the point cloud corresponding to at least one of the low-intensity regions of the surrounding environment; and the first figure of merit.

* * * * *